United States Patent
Stojanovic et al.

(10) Patent No.: US 11,233,596 B2
(45) Date of Patent: Jan. 25, 2022

(54) OPTICAL MULTIPLEXER/DEMULTIPLEXER MODULE AND ASSOCIATED METHODS

(71) Applicant: Ayar Labs, Inc., Emeryville, CA (US)

(72) Inventors: Vladimir Stojanovic, Berkeley, CA (US); Alexandra Wright, San Francisco, CA (US); Chen Sun, Berkeley, CA (US); Mark Wade, Berkeley, CA (US); Roy Edward Meade, Oakland, CA (US)

(73) Assignee: Ayar Labs, Inc., Santa Clara, CA (US)

( * ) Notice: Subject to any disclaimer, the term of this patent is extended or adjusted under 35 U.S.C. 154(b) by 0 days.

(21) Appl. No.: 16/510,829

(22) Filed: Jul. 12, 2019

(65) Prior Publication Data
US 2020/0021385 A1    Jan. 16, 2020

Related U.S. Application Data

(60) Provisional application No. 62/697,344, filed on Jul. 12, 2018, provisional application No. 62/698,856, (Continued)

(51) Int. Cl.
*H04J 14/02* (2006.01)
*H04Q 11/00* (2006.01)
(Continued)

(52) U.S. Cl.
CPC ...... *H04J 14/0209* (2013.01); *H04B 10/5059* (2013.01); *H04J 14/0267* (2013.01);
(Continued)

(58) Field of Classification Search
CPC .................................................. H04J 14/0201
See application file for complete search history.

(56) References Cited

U.S. PATENT DOCUMENTS 8,611,747 B1 * 12/2013 Wach ...................... H04J 14/02
398/79
8,897,606 B2 * 11/2014 Asghari ................ G02F 1/2257
385/2

(Continued)

OTHER PUBLICATIONS

Bogaerts et al., "Silicon microring resonators", Laser Photonics Rev. 6, No. 1, p. 47-73, 2012 (Year: 2012).*

*Primary Examiner* — Shi K Li
(74) *Attorney, Agent, or Firm* — Penilla IP, APC

(57) ABSTRACT

A TORminator module is disposed with a switch linecard of a rack. The TORminator module receives downlink electrical data signals from a rack switch. The TORminator module translates the downlink electrical data signals into downlink optical data signals. The TORminator module transmits multiple subsets of the downlink optical data signals through optical fibers to respective SmartDistributor modules disposed in respective racks. Each SmartDistributor module receives multiple downlink optical data signals through a single optical fiber from the TORminator module. The SmartDistributor module demultiplexes the multiple downlink optical data signals and distributes them to respective servers. The SmartDistributor module receives multiple uplink optical data signals from multiple servers and multiplexes them onto a single optical fiber for transmission to the TORminator module. The TORminator module coverts the multiple uplink optical data signals to multiple uplink electrical data signals, and transmits the multiple uplink electrical data signals to the rack switch.

44 Claims, 17 Drawing Sheets

Related U.S. Application Data filed on Jul. 16, 2018, provisional application No. 62/722,443, filed on Aug. 24, 2018.

(51) Int. Cl.
  *H04B 10/50* (2013.01)
  *G02B 6/293* (2006.01)
  *G02B 6/43* (2006.01)
  *G02B 6/42* (2006.01)

(52) U.S. Cl.
  CPC ...... *H04J 14/0278* (2013.01); *H04Q 11/0067* (2013.01); *H04Q 11/0071* (2013.01); *G02B 6/2938* (2013.01); *G02B 6/4295* (2013.01); *G02B 6/43* (2013.01)

(56) References Cited

U.S. PATENT DOCUMENTS

| | | | | |
|---|---|---|---|---|
| 2011/0217039 | A1* | 9/2011 | Smith | H04J 14/02 398/49 |
| 2016/0036550 | A1* | 2/2016 | Welch | G02B 6/2938 398/87 |
| 2016/0282640 | A1* | 9/2016 | Guzzon | G02B 6/29338 |
| 2017/0294966 | A1* | 10/2017 | Jia | H04B 10/64 |
| 2018/0356229 | A1* | 12/2018 | Porsandeh Khial | G01C 19/64 |

* cited by examiner

OPTICAL MULTIPLEXER/DEMULTIPLEXER MODULE AND ASSOCIATED METHODS

CLAIM OF PRIORITY

This application claims priority under 35 U.S.C. 119(e) to each of: 1) U.S. Provisional Patent Application No. 62/697,344, filed Jul. 12, 2018; 2) U.S. Provisional Patent Application No. 62/698,856, filed Jul. 16, 2018; and 3) U.S. Provisional Patent Application No. 62/722,443, filed Aug. 24, 2018. The disclosure of each above-identified application is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient mechanisms for transmitting laser light and detecting laser light at different nodes within the optical data network. In this regard, it can be necessary to convert data streams from an electrical domain to an optical domain, and vice-versa, and transmit data streams between various physically distributed computing systems. It is within this context that the present invention arises.

SUMMARY

In an example embodiment, a data communication system is disclosed. The data communication system includes a rack switch, a TORminator module, downlink optical fiber, an uplink optical fiber, and a SmartDistribuTOR module. The TORminator module is electrically connected to the rack switch. The TORminator module is configured to convert a number (N) of downlink data communication electrical signals received from the rack switch into corresponding N downlink data communication optical signals. The value of N is greater than one. Each of the N downlink data communication optical signals has a different optical wavelength. The TORminator module is configured to simultaneously direct the N downlink data communication optical signals to a first downlink optical port. The TORminator module is configured to generate N different wavelengths of continuous wave laser light and simultaneously direct the N different wavelengths of continuous wave laser light to the first downlink optical port. The TORminator module includes a first uplink optical port. The TORminator module is configured to convert N uplink data communication optical signals received through the first uplink optical port into N uplink data communication electrical signals. The TORminator module is configured to transmit the N uplink data communication electrical signals to the rack switch. The downlink optical fiber has a first end optically coupled to the first downlink optical port of the TORminator module. The uplink optical fiber has a first end optically coupled to the first uplink optical port of the TORminator module. The SmartDistribuTOR module has a second downlink optical port, a second uplink optical port, N server downlink optical ports, and N server uplink optical ports. The downlink optical fiber has a second end optically coupled to the second downlink optical port. The uplink optical fiber has a second end optically coupled to the second uplink optical port. The SmartDistribuTOR module is configured to respectively direct the N downlink data communication optical signals and the N different wavelengths of continuous wave laser light received through the second downlink optical port to the N server downlink optical ports. The SmartDistribuTOR module is configured to simultaneously direct N uplink data communication optical signals received through the N server uplink optical ports to the second uplink optical port.

In an example embodiment, a method is disclosed for controlling data communication. The method includes receiving a number (N) of downlink data communication electrical signals from a rack switch at a TORminator module. The value of N is greater than one. The method also includes operating the TORminator module to convert the N downlink data communication electrical signals into corresponding N downlink data communication optical signals. Each of the N downlink data communication optical signals has a different optical wavelength. The method also includes operating the TORminator module to simultaneously direct the N downlink data communication optical signals to a first downlink optical port of the TORminator module. The method also includes operating the TORminator module to generate N different wavelengths of continuous wave laser light. The method also includes operating the TORminator module to simultaneously direct the N different wavelengths of continuous wave laser light to the first downlink optical port of the TORminator module. The method also includes operating the TORminator module to receive N uplink data communication optical signals through a first uplink optical port of the TORminator module. The method also includes operating the TORminator module to convert the N uplink data communication optical signals into N uplink data communication electrical signals. The method also includes operating the TORminator module to transmit the N uplink data communication electrical signals to the rack switch.

In an example embodiment, an optical multiplexer/demultiplexer module is disclosed. The optical multiplexer/demultiplexer module includes a downlink optical port, an uplink optical port, a number (N) of server downlink optical ports, N server uplink optical ports, an optical demultiplexer, and an optical multiplexer. The optical demultiplexer is configured to separate N downlink data communication optical signals received through the downlink optical port based on optical wavelength. The optical demultiplexer is configured to respectively direct the N downlink data communication optical signals to the N server downlink optical ports. The optical demultiplexer is configured to separate N different wavelengths of continuous wave laser light received through the downlink optical port based on optical wavelength. The optical demultiplexer is configured to respectively direct the N different wavelengths of continuous wave laser light to the N server downlink optical ports. The optical multiplexer is configured to aggregate N uplink data communication optical signals received through the N server uplink optical ports onto a single optical waveguide optically coupled to the uplink optical port.

In an example embodiment, a method is disclosed for operating an optical multiplexer/demultiplexer module. The method includes receiving a number (N) of downlink data communication optical signals through a downlink optical port. The method also includes separating the N downlink data communication optical signals into N separate optical channels. The method also includes receiving N different wavelengths of continuous wave laser light through the downlink optical port. The method also includes separating the N different wavelengths of continuous wave laser light into the N separate optical channels. The method also includes respectively directing the N separate optical channels to N server downlink optical ports. The method also includes respectively receiving N uplink data communication optical signals through the N server uplink optical ports. The method also includes aggregating the N uplink data communication optical signals onto a single optical waveguide optically coupled to an uplink optical port.

In an example embodiment, an electro-optical interface module in disclosed. The electro-optical interface module includes an optical fiber interface configured to optically couple to a first optical fiber and a second optical fiber. The electro-optical interface module also includes an electronic-photonic chip that includes a first optical coupler and a second optical coupler. The first optical coupler is configured and connected to receive light transmitted through the optical fiber interface from the first optical fiber. The second optical coupler is configured and connected to direct light through the optical fiber interface to the second optical fiber. The electronic-photonic chip includes a downlink polarization control device configured to split light received through the first optical coupler into a first polarization of light and a second polarization of light. The electronic-photonic chip includes a downlink data receiver device configured and connected to receive light from the downlink polarization control device. The downlink data receiver device is configured and connected to filter downlink modulated light from the light received from the downlink polarization control device and convert the downlink modulated light into a downlink electrical data signal. The downlink data receiver device is configured and connected to direct unmodulated continuous wave light received from the downlink polarization control device to an optical output of the downlink data receiver device. The electronic-photonic chip includes an uplink data modulator device configured and connected to receive the unmodulated continuous wave light from the optical output of the downlink polarization control device. The uplink data modulator device is configured and connected to imprint an uplink electrical data signal on the unmodulated continuous wave light to generate uplink modulated light. The uplink data modulator device is configured and connected to direct the uplink modulated light to the second optical coupler. The electronic-photonic chip also includes an electrical input/output block configured and connected to receive the downlink electrical data signal from the downlink data receiver device and direct the downlink electrical data signal to circuitry external to the electronic-photonic chip. The electrical input/output block is configured and connected to receive the uplink electrical data signal from circuitry external to the electronic-photonic chip and direct the uplink electrical data signal to the uplink data modulator device.

In an example embodiment, a method is disclosed for operating an electro-optical interface of a server. The method includes receiving downlink light through a first optical coupler, where the downlink light includes downlink modulated light of a first wavelength and unmodulated continuous wave light of a second wavelength. The method also includes filtering the downlink modulated light from the downlink light. The method also includes converting the downlink modulated light into a downlink electrical data signal. The method also includes transmitting the downlink electrical data signal to processing circuitry. The method also includes imprinting an uplink electrical data signal on the unmodulated continuous wave light to generate uplink modulated light. The method also includes transmitting the uplink modulated light through the a second optical coupler.

DETAILED DESCRIPTION

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

In current data-centers, servers are organized in racks. Each rack includes a Top-of-Rack (TOR) switch, which connects the servers in the rack to the rest of the data-center network (typically called the core or the spine). Since the throughput of the switches increases faster than the throughput needs of each individual server in the rack, there exists an opportunity for a single switch to feed more than one rack, thereby eliminating a stage in the network hierarchy and providing significant latency and cost savings. This network architecture is known as End-of-Row (EOR) or Middle-of-Row (MOR), depending on the location of the switch within a row of racks. Specifically, EOR architecture has the switch located in the rack at the end of the row, and MOR architecture has the switch located in the rack at the middle of the row. In current data-centers, TOR architecture (in which a switch is located at the top of each rack) is preferred since rack-to-spine links are optical, while the dense server-to-TOR switch links are electrical, which minimizes the cabling costs.

Systems and methods are disclosed herein that utilize highly integrated electronic-photonic transceiver technology to provide a new EOR/MOR architecture in which photonic interconnects connect the servers in various racks to the EOR/MOR switch, enabling row connectivity capability that overcomes the length limitations of traditional copper cabling. This new EOR/MOR architecture is referred to as a "TORminator system" 100.

Figure 1:
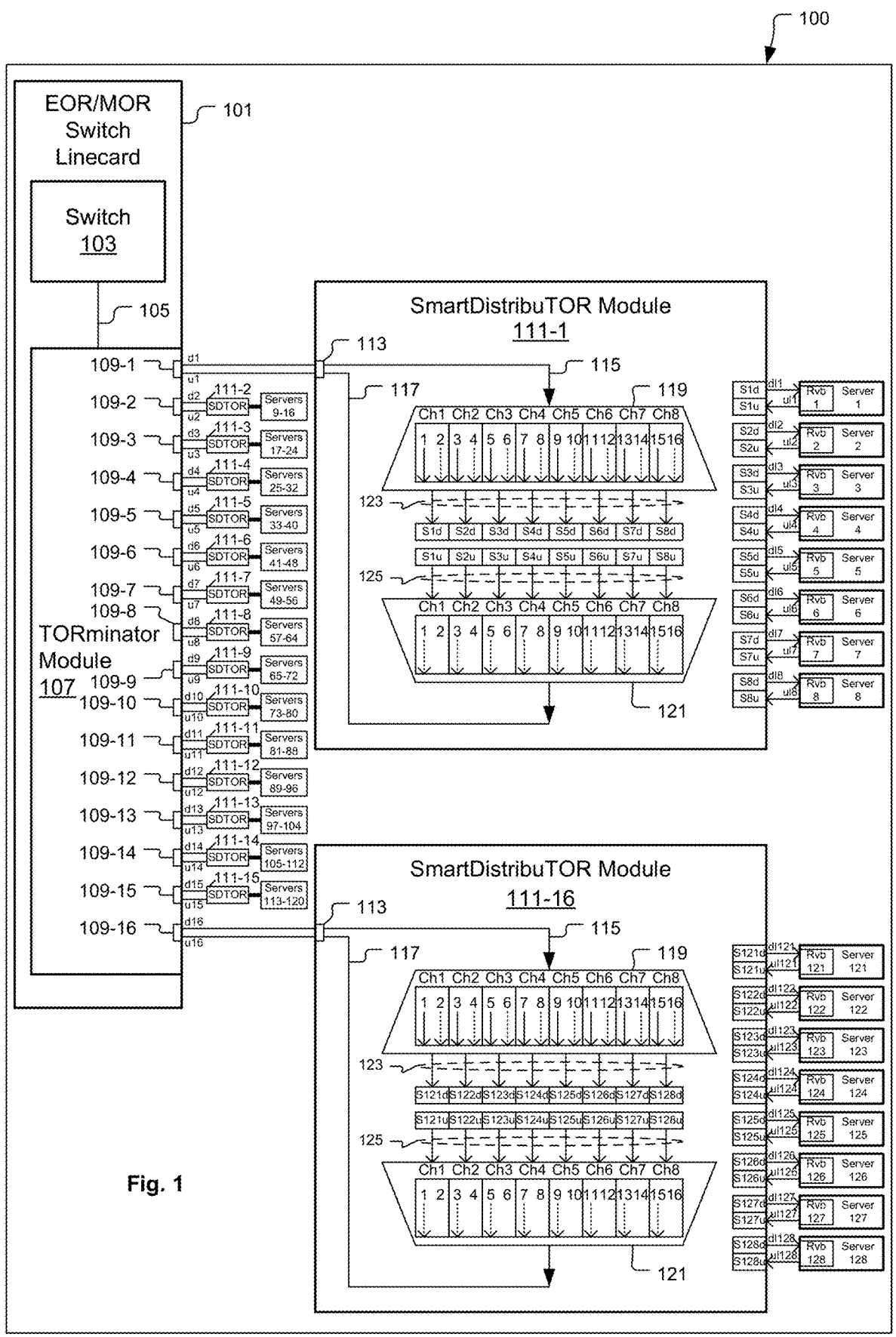
FIG. 1 shows a schematic of a TORminator system, in accordance with some embodiments.

FIG. 1 shows a schematic of the TORminator system 100, in accordance with some embodiments. FIG. 1 shows the connectivity within the TORminator system 100 between one EOR/MOR switch linecard 101 and a number (M) of servers. In the example of FIG. 1, M equals 128, such that the one EOR/MOR switch linecard 101 and the TORminator system 100 services 128 servers. In some embodiments, the M servers are distributed across multiple racks. In some embodiments, each rack includes a number (N) of servers. In the example of FIG. 1, N equals 8, with each rack including 8 servers.

A rack switch 103 in the linecard 101 is connected electrically to a TORminator module 107 on the linecard 101 through an electrical bus 105. In some embodiments, the electrical bus 105 is a 128 data communication lane, Pulse-Amplitude Modulation 4-Level (PAM4), Very Short Reach (VSR) bus operating at 100 gigabits per second per lane (Gbps/lane). In some embodiments, each data communication lane of the electrical bus 105 is a full-duplex differential signaling lane that includes one pair of conductors for transmitting data and one pair of conductors for receiving data. However, it should be understood that in other embodiments, alternative data communication lane configurations can be implemented. It should also be understood that in other embodiments, the electrical bus 105 can be configured to have more or less than 128 data communication lanes and can operate at either higher data rates or lower data rates than 100 Gbps/lane. In some embodiments, each data communication lane in the electrical bus 105 is designated to service a different server in the datacenter. Therefore, in some embodiments, the TORminator system 100 is configured to connect with 128 servers, and the electrical bus 105 is configured to include 128 data communication lanes.

The TORminator module 107 is configured and connected to convert the data from the electrical domain of the rack switch 103 to the optical domain that exists between the TORminator module 107 and the servers. The TORminator module 107 is configured to send data in the optical domain to a number (K) of SmartDistribuTOR modules 111-1 through 111-K. In the example of FIG. 1, K equals 16, such that the TORminator module 107 is configured to send data in the optical domain to 16 SmartDistribuTOR modules 111-1 through 111-16. It should be understood, however, that in other embodiments the number K of SmartDistribuTOR modules 111-1 through 111-K that are connected to a given TORminator module 107 can be either less than or greater than 16. The TORminator module 107 includes K duplex optical ports 109-1 through 109-K. Each optical port 109-1 through 109-K provides for optical coupling to a respective downlink optical fiber d1 through dK, and for optical coupling to a respective uplink optical fiber u1 through uK. In the example of FIG. 1, because K is 16, there are 16 optical ports 109-1 through 109-16 that respectively provide for optical coupling to downlink optical fibers d1 through d16, and that respectively provide for optical coupling to uplink optical fibers u1 through u16.

Each pair of downlink optical fibers d1 through dK and uplink optical fibers u1 through uK is connected to a respective one of the SmartDistribuTOR modules 111-1 through 111-K. For example, in FIG. 1, the pair of downlink optical fiber d1 and uplink optical fiber u1 is connected to the SmartDistribuTOR modules 111-1. Similarly, the pair of downlink optical fiber d16 and uplink optical fiber u16 is connected to the SmartDistribuTOR modules 111-16. Each of the SmartDistribuTOR modules 111-1 through 111-K has a duplex optical port 113 to which the corresponding downlink optical fiber d1 through dK and corresponding uplink optical fiber u1 through uK are connected.

In some embodiments, each of the SmartDistribuTOR modules 111-1 through 111-K is installed in a corresponding rack, e.g., at the top of a corresponding rack. Generally speaking, the SmartDistribuTOR module 111-1 through 111-K splits multiple optical channels from the corresponding downlink optical fiber d1 through dK, and respectively directs the multiple optical channels to multiple servers in the rack in which the SmartDistribuTOR module is located. Each optical channel includes at least one modulated laser light wavelength and at least one continuous wave (unmodulated) laser light wavelength.

FIG. 1 shows a schematic of the SmartDistribuTOR module 111-1 through 111-K with an example uplink and downlink wavelength plan per uplink and downlink optical fiber, in accordance with some embodiments. In some embodiments, dense wavelength division multiplexing (DWDM) can be used to pack a large number of optical channels and increase the number of servers reachable via a single uplink and downlink optical fiber pair. Each SmartDistribuTOR module 111-1 through 111-K includes a downlink optical waveguide 115 optically coupled through the optical port 113 to the corresponding downlink optical fiber d1 through dK. The downlink optical waveguide 115 is optically connected to an optical demultiplexer 119 that is configured to separate N downlink data communication optical signals received through the downlink optical waveguide 115 based on optical wavelength. The optical demultiplexer 119 is also configured to respectively direct the N downlink data communication optical signals to N server downlink optical ports S1d through SNd.

For example, FIG. 1 shows eight optical channels Ch1 through Ch8 transmitted through the downlink optical waveguide 115, with one modulated wavelength per optical channel Ch1 through Ch8, and with one unmodulated continuous wave wavelength per optical channel Ch1 through Ch8. Specifically, optical channel Ch1 includes one unmodulated continuous wave wavelength designated as signal 1, and one modulated wavelength designated as signal 2. Optical channel Ch2 includes one unmodulated continuous wave wavelength designated as signal 3, and one modulated wavelength designated as signal 4. Optical channel Ch3 includes one unmodulated continuous wave wavelength designated as signal 5, and one modulated wavelength designated as signal 6. Optical channel Ch4 includes one unmodulated continuous wave wavelength designated as signal 7, and one modulated wavelength designated as signal 8. Optical channel Ch5 includes one unmodulated continuous wave wavelength designated as signal 9, and one modulated wavelength designated as signal 10. Optical channel Ch6 includes one unmodulated continuous wave wavelength designated as signal 11, and one modulated wavelength designated as signal 12. Optical channel Ch7 includes one unmodulated continuous wave wavelength designated as signal 13, and one modulated wavelength designated as signal 14. Optical channel Ch8 includes one unmodulated continuous wave wavelength designated as signal 15, and one modulated wavelength designated as signal 16. In some embodiments, each modulated wavelength can carry 100 gigabits per second (Gbps) of data, by way of example. In some embodiments, each modulated wavelength can carry either more than or less than 100 Gbps of data.

In the example of FIG. 1, the optical demultiplexer 119 is configured to separate eight downlink data communication optical signals (signals 2, 4, 6, 8, 10, 12, 14, and 16) received through the downlink optical waveguide 115 based on optical wavelength. The optical demultiplexer 119 is also configured to respectively direct the eight downlink data communication optical signals (signals 2, 4, 6, 8, 10, 12, 14, and 16) through eight respective optical waveguides 123 to eight server downlink optical ports S1d through S8d. The optical demultiplexer 119 is also configured to separate eight unmodulated continuous wave optical signals (signals 1, 3, 5, 7, 9, 11, 13, and 15) received through the downlink optical waveguide 115 based on optical wavelength. The optical demultiplexer 119 is also configured to respectively direct the eight unmodulated continuous wave optical signals (signals 1, 3, 5, 7, 9, 11, 13, and 15) through the eight respective optical waveguides 123 to the eight server downlink optical ports S1d through S8d. Therefore, each server downlink optical port S1d through S8d transmits one downlink data communication optical signal and one unmodulated continuous wave optical signal to a corresponding server.

For example, both the unmodulated continuous wave optical signal 1 and the downlink data communication optical signal 2 that constitute channel Ch1 are transmitted through one of the optical waveguides 123 to the server downlink optical port S1d and through an optical fiber d11 to the server 1. Both the unmodulated continuous wave optical signal 3 and the downlink data communication optical signal 4 that constitute channel Ch2 are transmitted through one of the optical waveguides 123 to the server downlink optical port S2d and through an optical fiber d12 to the server 2. Both the unmodulated continuous wave optical signal 5 and the downlink data communication optical signal 6 that constitute channel Ch3 are transmitted through one of the optical waveguides 123 to the server downlink optical port S3d and through an optical fiber d13 to the server 3. Both the unmodulated continuous wave optical signal 7 and the downlink data communication optical signal 8 that constitute channel Ch4 are transmitted through one of the optical waveguides 123 to the server downlink optical port S4d and through an optical fiber d14 to the server 4. Both the unmodulated continuous wave optical signal 9 and the downlink data communication optical signal 10 that constitute channel Ch5 are transmitted through one of the optical waveguides 123 to the server downlink optical port S5d and through an optical fiber d15 to the server 5. Both the unmodulated continuous wave optical signal 11 and the downlink data communication optical signal 12 that constitute channel Ch6 are transmitted through one of the optical waveguides 123 to the server downlink optical port S6d and through an optical fiber d16 to the server 6. Both the unmodulated continuous wave optical signal 13 and the downlink data communication optical signal 14 that constitute channel Ch7 are transmitted through one of the optical waveguides 123 to the server downlink optical port S7d and through an optical fiber d17 to the server 7. Both the unmodulated continuous wave optical signal 15 and the downlink data communication optical signal 16 that constitute channel Ch8 are transmitted through one of the optical waveguides 123 to the server downlink optical port S8d and through an optical fiber d18 to the server 8.

Each SmartDistribuTOR module 111-1 through 111-K also includes an uplink optical waveguide 117 optically coupled through the optical port 113 to the corresponding uplink optical fiber u1 through uK. The uplink optical waveguide 117 is connected to the optical output of an optical multiplexer 121. The optical multiplexer 121 is configured to aggregate N uplink data communication optical signals received through the N server uplink optical ports S1u through SNu onto the single optical waveguide 117 optically coupled to the optical port 113. The example of FIG. 1 shows eight optical channels Ch1 through Ch8 on the uplink optical waveguide 117, with one modulated wavelength per optical channel Ch1 through Ch8.

In the example of FIG. 1, the SmartDistribuTOR module 111-1 includes eight server uplink optical ports S1u through S8u. The server uplink optical port S1u is connected to an uplink optical fiber u11 through which an uplink data communication optical signal 1 is transmitted. The server uplink optical port S1u is optically connected through a corresponding one of optical waveguides 125 to the optical multiplexer 121. The server uplink optical port S2u is connected to an uplink optical fiber u12 through which an uplink data communication optical signal 3 is transmitted. The server uplink optical port S2u is optically connected through a corresponding one of optical waveguides 125 to the optical multiplexer 121. The server uplink optical port S3u is connected to an uplink optical fiber u13 through which an uplink data communication optical signal 5 is transmitted. The server uplink optical port S3u is optically connected through a corresponding one of optical waveguides 125 to the optical multiplexer 121. The server uplink optical port S4u is connected to an uplink optical fiber u14 through which an uplink data communication optical signal 7 is transmitted. The server uplink optical port S4u is optically connected through a corresponding one of optical waveguides 125 to the optical multiplexer 121. The server uplink optical port S5u is connected to an uplink optical fiber u15 through which an uplink data communication optical signal 9 is transmitted. The server uplink optical port S5u is optically connected through a corresponding one of optical waveguides 125 to the optical multiplexer 121. The server uplink optical port S6u is connected to an uplink optical fiber u16 through which an uplink data communication optical signal 11 is transmitted. The server uplink optical port S6u is optically connected through a corresponding one of optical waveguides 125 to the optical multiplexer 121. The server uplink optical port S7u is connected to an uplink optical fiber u17 through which an uplink data communication optical signal 13 is transmitted. The server uplink optical port S7u is optically connected through a corresponding one of optical waveguides 125 to the optical multiplexer 121. The server uplink optical port S8u is connected to an uplink optical fiber u18 through which an uplink data communication optical signal 15 is transmitted. The server uplink optical port S8u is optically connected through a corresponding one of optical waveguides 125 to the optical multiplexer 121.

The uplink data communication optical signal 1 constitutes uplink channel Ch1. The uplink data communication optical signal 3 constitutes uplink channel Ch2. The uplink data communication optical signal 5 constitutes uplink channel Ch3. The uplink data communication optical signal 7 constitutes uplink channel Ch4. The uplink data communication optical signal 9 constitutes uplink channel Ch5. The uplink data communication optical signal 11 constitutes uplink channel Ch6. The uplink data communication optical signal 13 constitutes uplink channel Ch7. The uplink data communication optical signal 15 constitutes uplink channel Ch8. In some embodiments, each modulated wavelength corresponding to uplink data communication optical signals 1, 3, 5, 7, 9, 11, 13, and 15 can carry 100 Gbps of data, by way of example. In some embodiments, each modulated wavelength corresponding to uplink data communication optical signals 1, 3, 5, 7, 9, 11, 13, and 15 can carry either more than or less than 100 Gbps of data.

As shown in FIG. 1, an electro-optical module Rvb-1 through Rvb-M ("Reverb") is provided at each of servers 1 through M, respectively. Generally speaking, each electro-optical module Rvb-1 through Rvb-M receives at least one optical channel and converts the modulated optical wavelength on the received optical channel to an electrical data-stream which is then forwarded to a network interface of the corresponding server as downlink traffic. Also, the electro-optical module Rvb-1 through Rvb-M at each of servers 1 through M, respectively, modulates the continuous wave laser light wavelength with data provided by the network interface of the corresponding server for uplink connection to the rack switch 103 in the EOR/MOR switch linecard 101.

On the uplink connection path, modulated optical wavelengths from several of the electro-optical modules Rvb-1 through Rvb-M of several corresponding servers 1 through M are multiplexed together by the optical multiplexer 121 within the SmartDistribuTOR module 111-1 through 111-K onto corresponding optical fibers u1 through uK connecting the SmartDistribuTOR module 111-1 through 111-K with the TORminator module 107 on the EOR/MOR switch linecard 101. For example, FIG. 1 shows that modulated optical wavelengths from electro-optical modules Rvb-1 through Rvb-8 of corresponding servers 1 through 8 are multiplexed together by the optical multiplexer 121 within the SmartDistribuTOR module 111-1 onto the uplink optical waveguide 117 for transmission over the optical fiber u1 that connects the SmartDistribuTOR module 111-1 with the TORminator module 107 on the EOR/MOR switch linecard 101. Similarly, FIG. 1 shows that modulated optical wavelengths from electro-optical modules Rvb-121 through Rvb-128 of corresponding servers 121 through 128 are multiplexed together by the optical multiplexer 121 within the SmartDistribuTOR module 111-16 onto the uplink optical waveguide 117 for transmission over the optical fiber u16 that connects the SmartDistribuTOR module 111-16 with the TORminator module 107 on the EOR/MOR switch linecard 101. The TORminator module 107 converts multiple modulated optical wavelengths from multiple optical fibers into a multiple corresponding electrical data streams that are forwarded to the rack switch 103 on the linecard 101 as uplink data traffic.

Figure 2A:
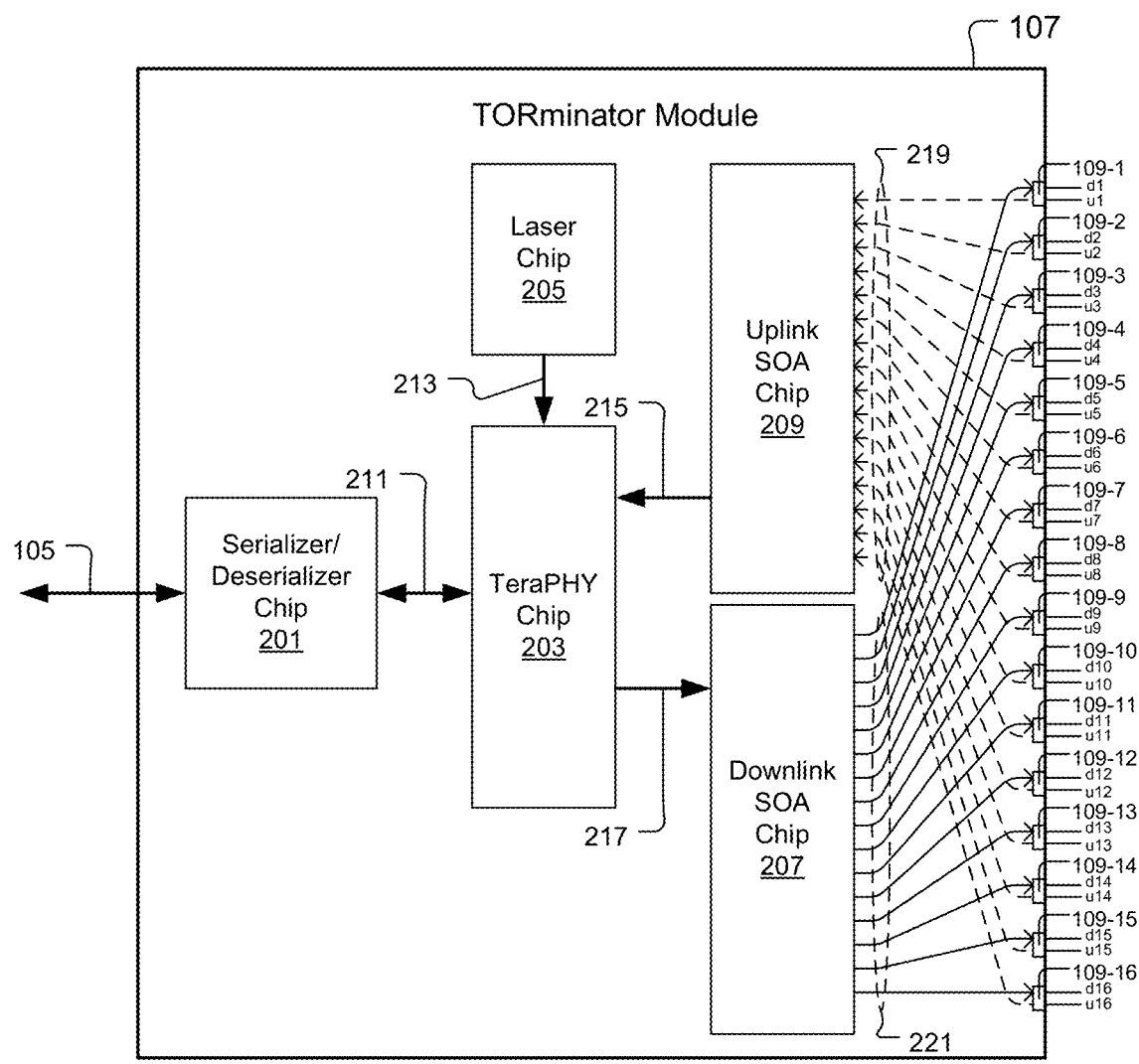
FIG. 2A shows an example schematic of a TORminator module, in accordance with some embodiments.

FIG. 2A shows an example schematic of the TORminator module 107, in accordance with some embodiments. The TORminator module 107 includes a multi-port, multi-wavelength-per-port laser supply chip 205 (e.g., SuperNova laser chip by Ayar Labs, Inc.) that provides multiple wavelengths of laser light to a TeraPHY chip 203, as indicated by optical connection 213. The TeraPHY chip 203 within the TORminator module 107 receives the electrical downlink data stream from the rack switch 103, via an optional serializer/deserializer (SerDes) chip 201, as indicated by electrical connection 211. The TeraPHY chip 203 modulates the wavelengths of laser light provided by the laser supply chip 205 with the electrical downlink data stream. In some embodiments, the optical signals from the TeraPHY chip 203 go directly to the SmartDistribuTOR modules 111-1 through 111-K through the optical ports 109-1 through 109-K and corresponding optical fibers d1 through dK. In some embodiments, the optical signals from the TeraPHY chip 203 are transmitted through optical connection 217 to a downlink semiconductor optical amplifier (SOA) array chip 207 (e.g., Arc SOA chip) that operates to amplify the optical signals before the optical signals are transmitted from the TORminator module 107 to the SmartDistribuTOR modules 111-1 through 111-K. FIG. 2A shows a collection of optical waveguides 221 configured to convey the optical signals form the SOA chip 207 to the respective optical ports 109-1 through 109-K.

In some embodiments, the optical uplink signals received by the TORminator module 107 from the SmartDistribuTOR modules 111-1 through 111-K are coupled directly to the TeraPHY chip 203. The TeraPHY chip 203 functions to convert the received optical uplink signals to electrical data streams and forward the electrical data streams to the rack switch 103. In some embodiments, the electrical data streams are processed by the SerDes chip 201 in route to the rack switch 103. In some embodiments, the optical uplink signals received by the TORminator module 107 from the SmartDistribuTOR modules 111-1 through 111-K are first coupled into an SOA array chip 209 (e.g., Arc SOA chip) for amplification. FIG. 2A shows a collection of optical waveguides 219 configured to convey the optical signals form the respective optical ports 109-1 through 109-K to the SOA chip 209. Then, the amplified optical uplink signals are coupled/transmitted from the SOA array chip 209 through optical connection 215 into the TeraPHY chip 203.

In some embodiments, the TeraPHY chip 203 includes silicon-photonic components driven by the SerDes chip 201. In some embodiments, the TeraPHY chip 203 includes silicon-photonic components and electronic transceiver circuitry monolithically integrated on the same die. In some embodiments, the laser chip 205 is implemented in an Indium Phosphide (InP) process. In some embodiments, the SOA array chip 207 is implemented in an InP process capable of handling both polarizations of light. And, in some embodiments, the SOA array chip 209 is implemented in an InP process capable of handling both polarizations of light.

In some embodiments, the TORminator module 107 is an edge-pluggable module having the laser chip 205, the SerDes chip 201, the TeraPHY chip 203, and the SOA array chips 207, 209 packaged on a printed circuit board (PCB) of the TORminator module 107. In these embodiments, the TORminator module 107 can be connected to the edge-style pluggable connector mounted on the EOR/MOR switch linecard 101. In some embodiments, the TORminator module 107 is connected to the EOR/MOR switch linecard 101 using a mezzanine connector. In some embodiments, the TeraPHY chip 203, the laser chip 205, and the SOA array chips 207, 209 are socketed to the EOR/MOR switch linecard 101. In some embodiments, the TeraPHY chip 203 is co-packaged with the rack switch 103, while the laser chip 205 and the SOA array chips 207, 209 are mounted separately to the EOR/MOR switch linecard 101.

In some embodiments, the multiple wavelengths (e.g., 16 wavelengths) of laser light provided by the laser chip 205 are coupled to one or more optical transceiver macros on the TeraPHY chip 203. Each optical transceiver macro on the TeraPHY chip 203 includes a transmit macro and a receive macro. Each of the transmit and receive macros includes slices (one slice per wavelength). The transmit macro includes a common optical waveguide and a number of ring modulators (one per slice) coupled into the common optical waveguide, where each ring modulator is centered to modulate one of the incoming wavelengths from the laser chip 205. In some embodiments, the ring modulators in the transmit macro are configured according to the channelized wavelength plan as shown in the SmartDistribuTOR modules 111-1 through 111-K of FIG. 1, such that some of the wavelengths are modulated for downlink traffic and some of the wavelengths are left unmodulated to be forwarded to the servers 1 through N connected to the corresponding SmartDistribuTOR module to provide for modulation of uplink data communication traffic. In some embodiments, the ring modulators in each slice are driven by the electrical circuits in that slice on the same TeraPHY chip 203. Or, in some embodiments, the ring modulators in each slice are driven by the electrical circuits on a separate die. In the receiver macro, a ring-resonator filter in each slice drops a corresponding wavelength from the common optical waveguide. This corresponding wavelength is then converted into an electrical signal by a photodetector embedded in that slice. In some embodiments, the photodetector and the ring filter are combined into a single structure. In some embodiments, the electrical signal from the photodetector is further amplified by the receiver circuits on the same TeraPHY chip 203 and forwarded to the rack switch 103. In some embodiments, the TeraPHY chip 203 includes only optical components, and the associated electrical circuit components are located on a separate chip. In some embodiments, the electrical link between the rack switch 103 and the electro-optical components in the TeraPHY chip 203 is retimed. However, in some embodiments, the electrical link between the rack switch 103 and the electro-optical components in the TeraPHY chip 203 is not retimed.

The laser chip 205 is designed and configured to supply laser light having one or more wavelengths. It should be understood that the term "wavelength" as used herein refers to the wavelength of electromagnetic radiation. And, the term "light" as used herein refers to electromagnetic radiation within a portion of the electromagnetic spectrum that is usable by optical data communication systems. In some embodiments, the portion of the electromagnetic spectrum includes light having wavelengths within a range extending from about 1100 nanometers to about 1565 nanometers (covering from the O-Band to the C-Band, inclusively, of the electromagnetic spectrum). However, it should be understood that the portion of the electromagnetic spectrum as referred to herein can include light having wavelengths either less than 1100 nanometers or greater than 1565 nanometers, so long as the light is usable by an optical data communication system for encoding, transmission, and decoding of digital data through modulation/de-modulation of the light. In some embodiments, the light used in optical data communication systems has wavelengths in the near-infrared portion of the electromagnetic spectrum. Also, the term "laser beam" as used herein refers to a beam of light generated by a laser device. It should be understood that a laser beam may be confined to propagate in an optical waveguide, such as (but not limited to) an optical fiber or an optical waveguide within a planar lightwave circuit (PLC). In some embodiments, the laser beam is polarized. And, in some embodiments, the light of a given laser beam has a single wavelength, where the single wavelength can refer to either essentially one wavelength or can refer to a narrow band of wavelengths that can be identified and processed by an optical data communication system as if it were a single wavelength.

Figure 2B:
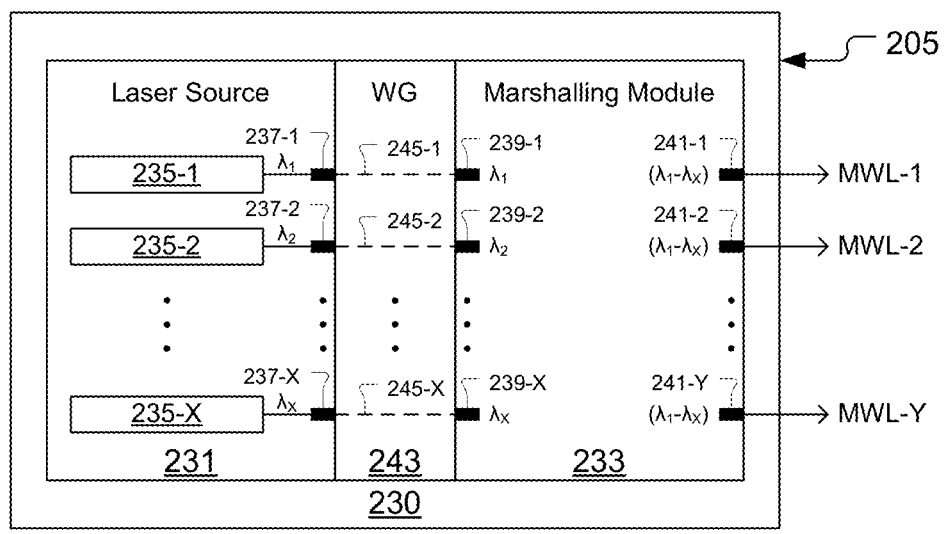
FIG. 2B shows an example architectural diagram of a laser chip, in accordance with some embodiments of the present invention.

FIG. 2B shows an example architectural diagram of the laser chip 205, in accordance with some embodiments of the present invention. The laser chip 205 includes a laser source 231 and an optical marshalling module 233. The laser source 231 is configured to generate and output a plurality of laser beams, i.e., (X) laser beams. The plurality of laser beams have different wavelengths ($\lambda_1$-$\|_X$) relative to each other, where the different wavelengths ($\lambda_1$-$\|_X$) are distinguishable to an optical data communication system. In some embodiments, the laser source 231 includes a plurality of lasers 235-1 to 235-X for respectively generating the plurality (X) of laser beams, where each laser 235-1 to 235-X generates and outputs a laser beam at a respective one of the different wavelengths ($\lambda_1$-$\|_X$). Each laser beam generated by the plurality of lasers 235-1 to 235-X is provided to a respective optical output port 237-1 to 237-X of the laser source 231 for transmission from the laser source 231. In some embodiments, each of the plurality of lasers 235-1 to 235-X is a distributed feedback laser configured to generate laser light at a particular one of the different wavelengths ($\lambda_1$-$\|_X$). In some embodiments, the laser source 231 can be defined as a separate component, such as a separate chip. However, in other embodiments, the laser source 231 can be integrated within a planar lightwave circuit (PLC) on a chip that includes other components in addition to the laser source 231.

In the example embodiment of FIG. 2B, the laser source 231 is defined as a separate component attached to a substrate 230, such as an electronic packaging substrate. In various embodiments, the substrate 230 can be an organic substrate or a ceramic substrate, or essentially any other type of substrate upon which electronic devices and/or optical-electronic devices and/or optical waveguides and/or optical fiber(s)/fiber ribbon(s) can be mounted. For example, in some embodiments, the substrate 230 can be an Indium-Phosphide (III-V) substrate. Or, in another example, the substrate 230 can be an $Al_2O_3$ substrate. It should be understood that in various embodiments the laser source 231 can be attached/mounted to the substrate 230 using essentially any known electronic packaging process, such as flip-chip bonding, which can optionally include disposition of a ball grid array (BGA), bumps, solder, under-fill, and/or other component(s), between the laser source 231 and the substrate 230, and include bonding techniques such as mass reflow, thermal-compression bonding (TCB), or essentially any other suitable bonding technique.

The optical marshalling module 233 is configured to receive the plurality of laser beams of the different wavelengths ($\lambda_1$-$\|_X$) from the laser source 231 at a corresponding plurality of optical input ports 239-1 to 239-X of the optical marshalling module 233. The optical marshalling module 233 is also configured to distribute a portion of each of the plurality of laser beams to each of a plurality of optical output ports 241-1 to 241-Y of the optical marshalling module 233, where (Y) is the number of optical output ports of the optical marshalling module 233. The optical marshalling module 233 operates to distribute the plurality of laser beams such that all of the different wavelengths ($\lambda_1$-$\|_X$) of the plurality of laser beams are provided to each of the plurality of optical output ports 241-1 to 241-Y of the optical marshalling module 233. Therefore, it should be understood that the optical marshalling module 233 operates to provide light at all of the different wavelengths ($\lambda_1$-$\|_X$) of the plurality of laser beams to each one of the optical output ports 241-1 to 241-Y of the optical marshalling module 233, as indicated in FIG. 2B. In this manner, for the laser chip 205, each one of the optical output ports 241-1 to 241-Y of the optical marshalling module 233 provides a corresponding one of a plurality of multi-wavelength laser outputs MWL-1 to MWL-Y.

In some embodiments, the optical marshalling module 233 is configured to maintain a polarization of each of the plurality of laser beams between the plurality of optical input ports 239-1 to 239-X of the optical marshalling module 233 and the plurality of optical output ports 241-1 to 241-Y of the optical marshalling module 233. Also, in some embodiments, the optical marshalling module 233 is configured such that each of the plurality of optical output ports 241-1 to 241-Y of the optical marshalling module 233 receives a similar amount of optical power of any given one of the plurality of laser beams within a factor of five. In other words, in some embodiments, the amount of light of a given wavelength, i.e., one of the different wavelengths ($\lambda_1$-$\|_X$), that is provided by the optical marshalling module 233 to a particular one of the optical output ports 241-1 to 241-Y is the same within a factor of five to the amount of light of the given wavelength that is provided by the optical marshalling module 233 to others of the optical output ports 241-1 to 241-Y. It should be understood that the factor of five mentioned above is an example embodiment. In other embodiments, the factor of five mentioned above can be changed to a factor of another value, such as to a factor of two, or three, or four, or six, etc., or to any other value in between or less than or greater than. The point to be understood is that the optical marshalling module 233 can be configured to control the amount of light of a given wavelength that is provided to each of the optical output ports 241-1 to 241-Y of the optical marshalling module 233, and in turn can be configured to control a uniformity of the amount of light of a given wavelength provided to each of the optical output ports 241-1 to 241-Y of the optical marshalling module 233.

In the example embodiment, of FIG. 2B, the optical marshalling module 233 is defined as a separate component attached to the substrate 230. Therefore, it should be understood that in the example embodiment of the laser chip 205, the laser source 231 and the optical marshalling module 233 are physically separate components. It should be understood that in various embodiments the optical marshalling module 233 can be attached/mounted to the substrate 230 using essentially any known electronic packaging process. Also, in some embodiments, the optical marshalling module 233 is configured as a non-electrical component, i.e., as a passive component, and can be attached/mounted to the substrate 230 using techniques that do not involve establishment of electrical connections between the optical marshalling module 233 and the substrate 230, such as by use of an epoxy or other type of adhesive material. In some embodiments, rather than being defined as a separate component, the optical marshalling module 233 can be integrated within a PLC on a chip that includes other components in addition to the optical marshalling module 233. In some embodiments, both the optical marshalling module 233 and the laser source 231 are implemented together within a same PLC.

In some embodiments, the laser source 231 is aligned with the optical marshalling module 233 to direct the plurality of laser beams transmitted from the optical outputs 237-1 to 237-X of the laser source 231 into respective ones of the optical input ports 239-1 to 239-X of the optical marshalling module 233. In some embodiments, the optical marshalling module 233 is positioned spaced apart from the laser source 231. In some embodiments, the optical marshalling module 233 is positioned in contact with the laser source 231. And, in some embodiments, a portion of the optical marshalling module 233 is positioned to overlap a portion of the laser source 231. In the example embodiment of the laser chip 205 as shown in FIG. 2B, the optical marshalling module 233 is positioned spaced apart from the laser source 231, and an optical waveguide 243 is positioned between the laser source 231 and the optical marshalling module 233. The optical waveguide 243 is configured to direct the plurality of laser beams from the laser source 231 into respective ones of the plurality of optical input ports 239-1 to 239-X of the optical marshalling module 233, as indicated by lines 245-1 to 245-X.

In various embodiments, the optical waveguide 243 can be formed of essentially any material through which light can be channeled from an entry location on the optical waveguide 243 to an exit location on the optical waveguide 243. For example, in various embodiments, the optical waveguide 243 can be formed of glass, SiN, SiO2, germanium-oxide, and/or silica, among other materials. In some embodiments, the optical waveguide 243 is configured to maintain a polarization of the plurality of laser beams between the laser source 231 and the optical marshalling module 233. In some embodiments, the optical waveguide 243 includes (X) optical conveyance channels, where each optical conveyance channel extends from a respective one of the optical output ports 237-1 to 237-X of the laser source 231 to a respective one of the optical input ports 239-1 to 239-X of the optical marshalling module 233. In some embodiments, each of the (X) optical conveyance channels of the optical waveguide 243 has a substantially rectangular cross-section in a plane normal to a direction of propagation of the laser beam, i.e., normal to the x-direction as shown in FIG. 2B, which serves to maintain a polarization of the laser beam as it propagates from the laser source 231 to the optical marshalling module 233.

In the example embodiment of FIG. 2B, the optical waveguide 243 is defined as a separate component attached to the substrate 230. Therefore, it should be understood that in the example embodiment of the laser chip 205, the laser source 231, the optical waveguide 243, and the optical marshalling module 233 are physically separate components. It should be understood that in various embodiments the optical waveguide 243 can be attached/mounted to the substrate 230 using essentially any known electronic packaging process. Also, in some embodiments, the optical waveguide 243 is configured as a non-electrical component, i.e., as a passive component, and can be attached/mounted to the substrate 230 using techniques that do not involve establishment of electrical connections between the optical waveguide 243 and the substrate 230, such as by use of an epoxy or other type of adhesive material. In some embodiments, rather than being defined as a separate component, the optical waveguide 243 can be integrated within a PLC on a chip that includes other components in addition to the optical waveguide 243. In some embodiments, laser source 231, the optical waveguide 243, and the optical marshalling module 233 are implemented together within a same PLC.

In some embodiments, the laser chip 205 includes a thermal spreader component disposed proximate to the laser source 231. The thermal spreader component is configured to spread a thermal output of the plurality of lasers 235-1 to 235-X to provide substantial uniformity in temperature-dependent wavelength drift among the plurality of lasers 235-1 to 235-X. In some embodiments, the thermal spreader component is included within the laser source 231. In some embodiments, the thermal spreader component is included within the substrate 230. In some embodiments, the thermal spreader component is defined separate from each of the laser source 231, the optical marshalling module 233, and the substrate 230. In some embodiments, the thermal spreader component is included within the optical marshalling module 233, with the thermal spreader component portion of the optical marshalling module 233 physically overlapping the laser source 231. In some embodiments, the thermal spreader component is included within the optical waveguide 243, with the thermal spreader component portion of the optical waveguide 243 physically overlapping the laser source 231. In various embodiments, the thermal spreader component is formed of a thermally conductive material, such as a metallic material by way of example. In some embodiments, the thermal spreader component can incorporate an element configured to actively transfer heat away from the plurality of lasers 235-1 to 235-X, such as a thermoelectric cooler by way of example. Also, in some embodiments, the thermal spreader component is formed to have a sufficient bulk mass so as to function as a heat sink for heat emanating from the plurality of lasers 235-1 to 235-X of the laser source 231. Additional description of various embodiments of the laser chip 205 is provided in U.S. patent application Ser. No. 15/650,586, which is incorporated in its entirety herein by reference, and in U.S. patent application Ser. No. 16/194,250, which is incorporated in its entirety herein by reference.

Figure 2C:
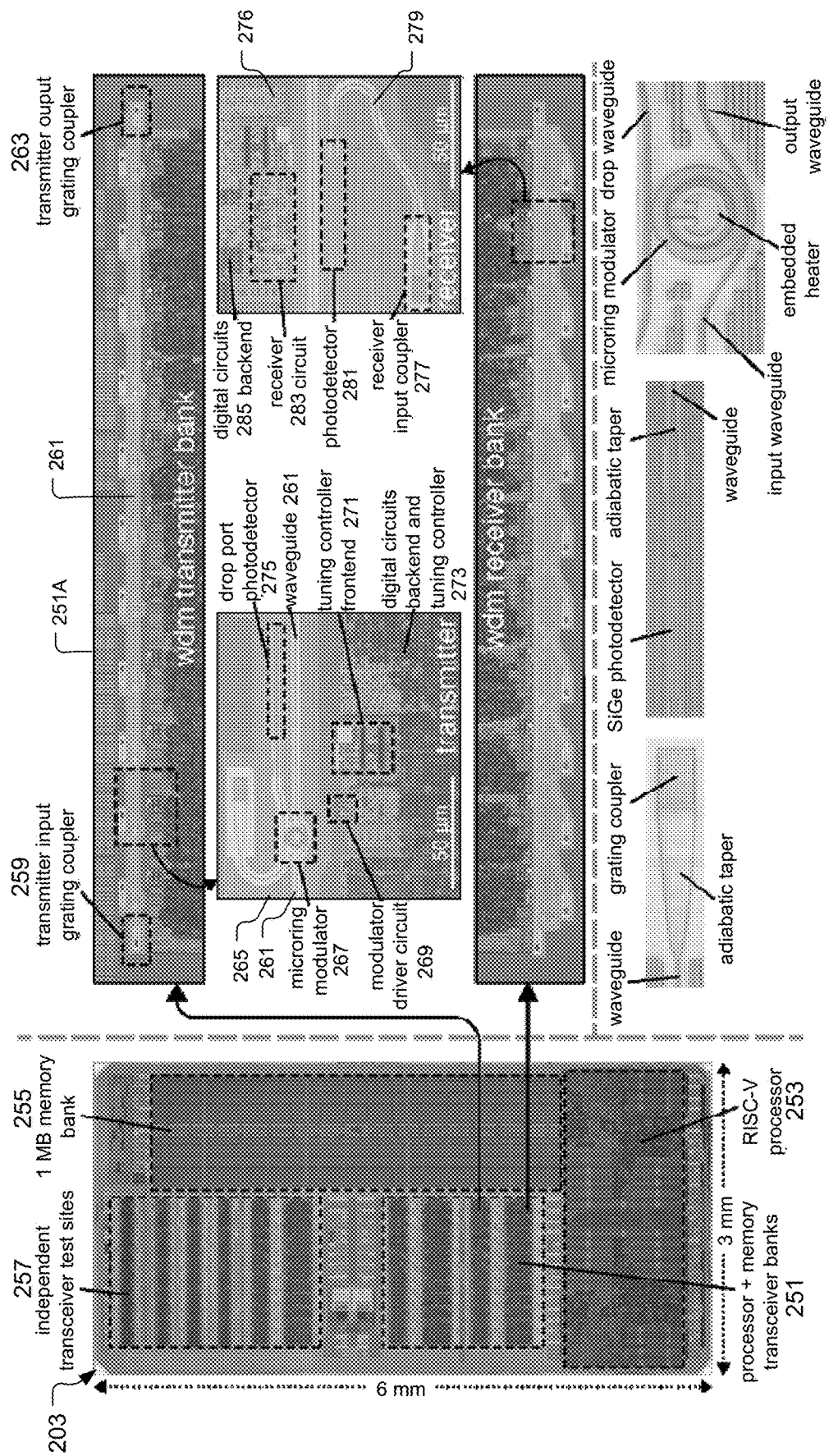
FIG. 2C shows an example architectural diagram of a TeraPHY chip, in accordance with some embodiments.

FIG. 2C shows an example architectural diagram of the TeraPHY chip 203, in accordance with some embodiments. In the example of FIG. 2C, the TeraPHY chip 203 includes processor and memory transceiver banks 251, a processor 253, a memory bank 255, and independent transceiver test sites 257. FIG. 2C also shows an enlarged view of an example transmitter bank 251A that is formed within the processor and memory transceiver banks 251. The example transmitter bank 251A includes a optical input 259 for receiving laser light from the laser chip 205. In some embodiments, the optical input 259 is an optical grating coupler. The transmitter bank 251A also includes an optical waveguide 261 that extends from the optical input 259 to an optical output 263 of the transmitter bank 251A. In some embodiments, the optical output 263 is an optical grating coupler. The optical waveguide 261 passes through a series of optical transmitters formed within the transmitter bank 251A. The example transmitter bank 251A includes eleven optical transmitters.

FIG. 2C shows an enlarged view of an example optical transmitter 265. Within the optical transmitter 265, the optical waveguide 261 passes by/around a ring resonator of microring modulator 267. Light modulation provided by the microring modulator 267 is controlled by a modulator driver circuit 269. The modulator driver circuit 269 controls the microring modulator 267 to generate modulated laser light that corresponds to an imprinting of an electrical data communication stream onto continuous wave laser light. The modulated laser light exits the microring modulator 267 through the optical waveguide 261 and continues on to the optical output 263 of the transmitter bank 251A. The optical transmitter 265 also includes a tuning controller circuit 271 configured and connected to control a temperature of the microring modulator 267 in order to operate the microring modulator 267 at a specific resonant wavelength. In this manner, the modulated laser light generated by the microring modulator 267 is at the specific resonant wavelength. The optical transmitter 265 also includes backend digital circuitry 273 to support operation of the various electrical components within the optical transmitter 265. The optical transmitter 265 also includes a drop port photodetector 275 that is optically coupled to the microring modulator 267 to provide for detection and measurement of wavelength-specific light absorption within the ring resonator of the microring modulator 267.

FIG. 2C also shows an enlarged view of an example optical receiver bank 251B that is formed within the processor and memory transceiver banks 251. The optical receiver bank 251B includes multiple optical receivers, each configured and connected to receive modulated laser light and demodulate the received modulated laser light to generate a corresponding digital data communication stream. FIG. 2C shows an enlarged view of one of the optical receivers 276. The optical receiver 276 includes an optical input 277 for receiving modulated laser light. In some embodiments, the optical input 277 is an optical grating coupler. The optical input 277 is connected through a corresponding optical waveguide 279 to a photodetector 281. The photodetector 281 is controlled and operated to provide wavelength-specific detection of light coming in through the optical waveguide 279. The optical receiver 276 also includes a receiver circuit 283 configured and connected to generate a digital data communication stream that corresponds to the incoming stream of modulated light as detected by the photodetector 281. The optical receiver 276 also includes backend digital circuitry 285 to support operation of the various electrical components within the optical receiver 276. In the example of FIG. 2C, the optical receiver bank 251B includes eleven separate optical receivers 276. In some embodiments, the TeraPHY chip 203 can be configured as described in Sun, Chen, et al. "Single-chip microprocessor that communicates directly using light." *Nature* 528.7583 (2015): 534, which is incorporated in its entirety herein by reference for all purposes.

Figure 2D:
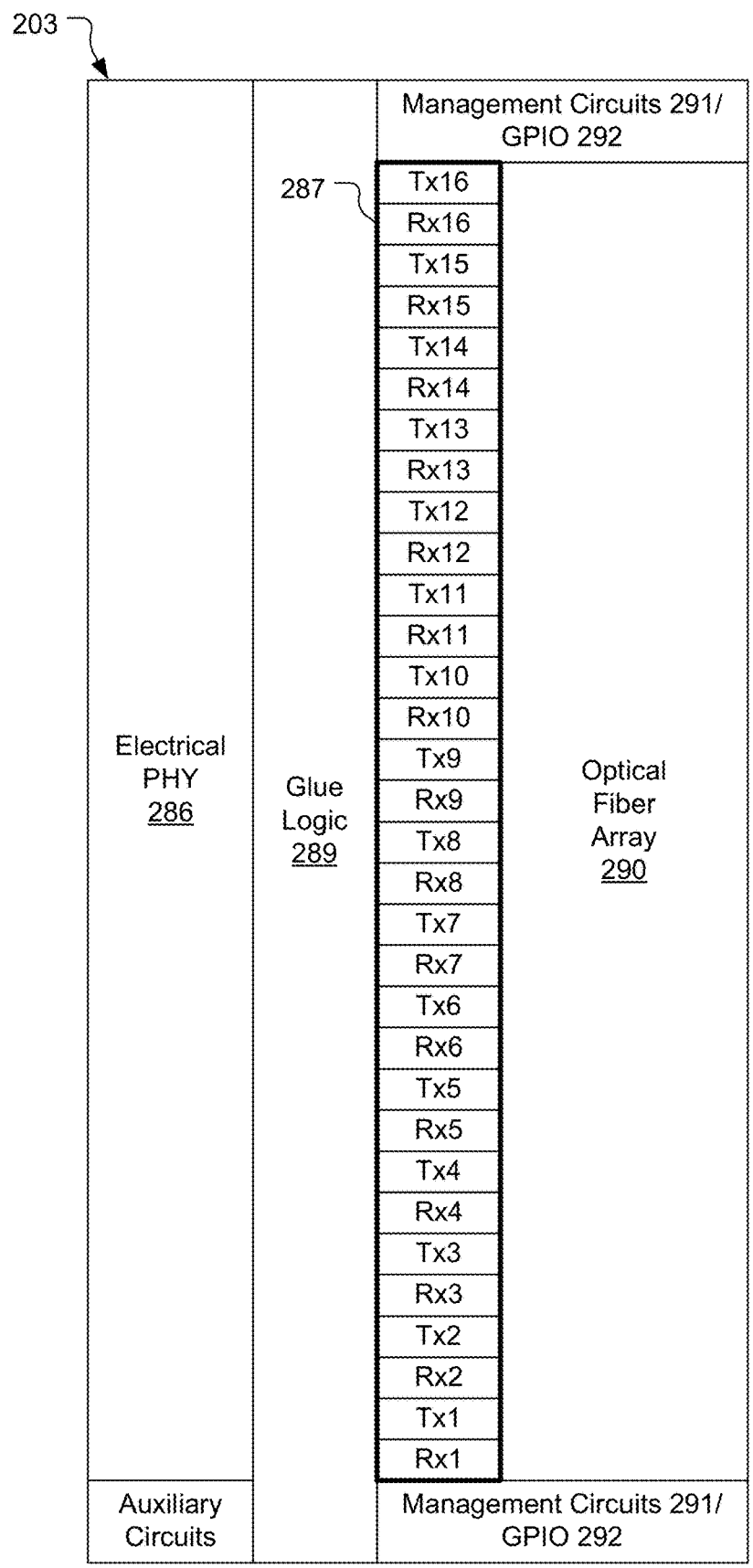
FIG. 2D shows an example schematic diagram of a TeraPHY chip, in accordance with some embodiments.

FIG. 2D shows an example schematic diagram of the TeraPHY chip 203, in accordance with some embodiments. The TeraPHY chip 203 includes an electrical PHY specification 286. In some embodiments, the electrical PHY specification 286 is an Advance Interface Bus by Intel. In some embodiments, the electrical PHY specification 286 includes a High Bandwidth Memory (HBM) and Kandou Bus for serialization/deserialization of data. The electrical PHY specification 286 is interfaced with an optical PHY specification 287 through glue logic 289. The optical PHY specification 287 includes a number of pairs of optical transmitters (Tx) and optical receivers (Rx). The glue logic 289 includes cross-bar switches and other circuitry as needed to interface the electrical PHY specification 286 with the optical PHY specification 287. In some embodiments, the optical transmitters (Tx) and optical receivers (Rx) are combined in pairs, with each Tx/Rx pair forming an optical transceiver. The optical transmitters (Tx) and optical receivers (Rx) are optically connected to an optical fiber array 290. The optical fiber array 290 provides for attachment of respective optical fibers to each of the optical transmitters (Tx) and optical receivers (Rx) in the optical PHY specification 287. In various embodiments, the optical fibers can be optically connected to the optical transmitters (Tx) and optical receivers (Rx) through vertical optical grating couplers, edge optical couplers, or essentially any other type of optical coupling device. The TeraPHY chip 203 also includes management circuits 291 and general purpose input/output (GPIO) components 292 for communicating electrical data signals to and from the TeraPHY chip 203. In various embodiments, the GPIO components 292 can include Serial Peripheral Interface (SPI) components and/or another type of component to enable off-chip data communication. It should be understood that the TeraPHY chip 203 can also include many other circuits, such as memory (e.g., SRAM), a CPU, analog circuits, or any other circuit that can be designed in CMOS.

Figure 2E:
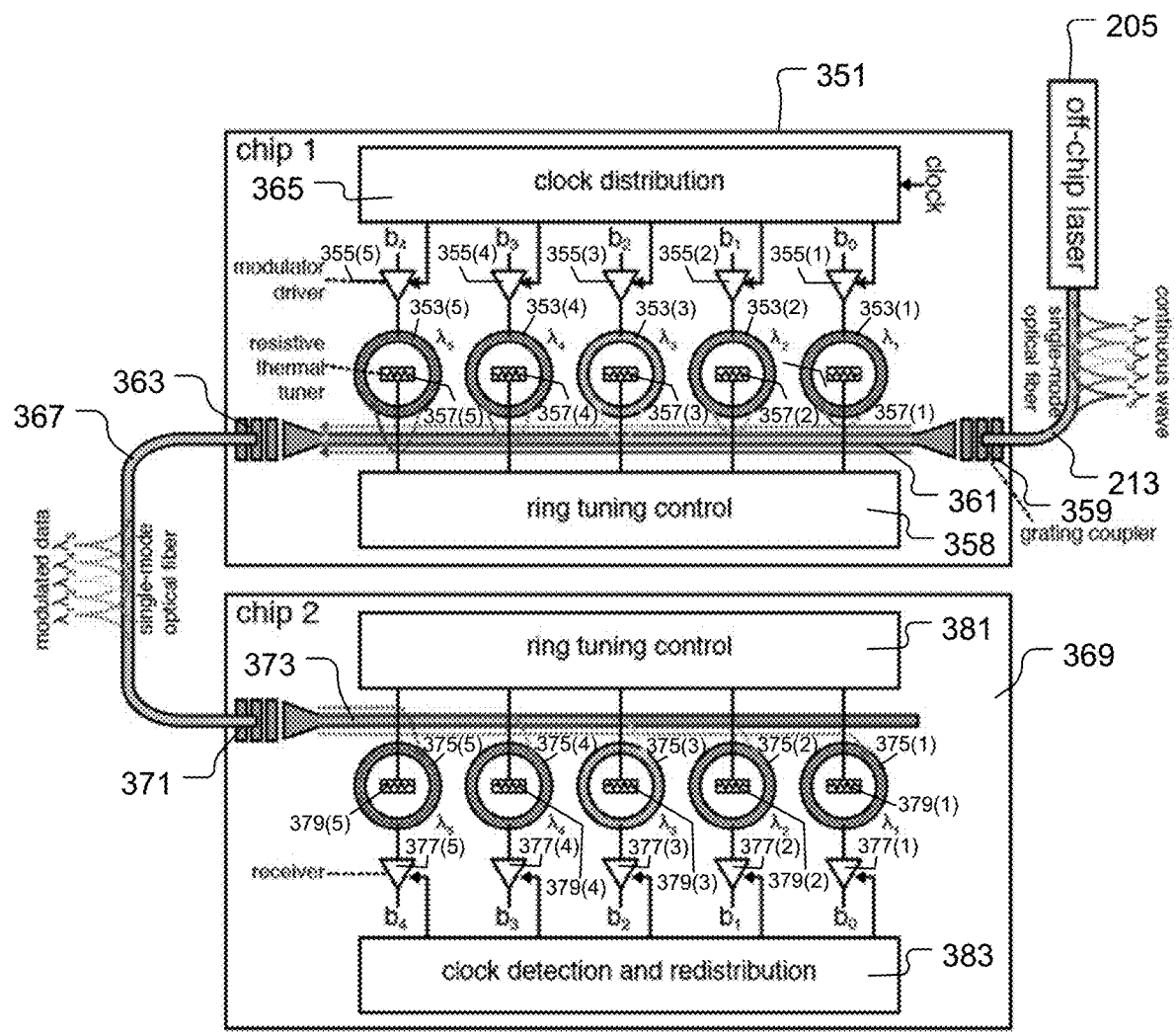
FIG. 2E shows an example schematic diagram of chip-to-chip optical data communication, in accordance with some embodiments.

FIG. 2E shows an example schematic diagram of chip-to-chip optical data communication, in accordance with some embodiments. FIG. 2E shows an example optical transmitter bank 351 within a first chip (chip 1) operating to modulate five different wavelengths of continuous wave laser light to in turn generate five modulated light data streams, where each modulated light data stream corresponds to an input electrical data stream. In some embodiments, the example optical transmitter bank 351 represents components within the TeraPHY chip 203. The optical transmitter bank 351 includes five ring resonators 353(1)-353(5) respectively controlled by five modulator drivers 355(1)-355(5). Each of the five ring resonators 353(1)-353(5) has a corresponding resistive thermal tuner (heater) 357(1)-357(5) that is controlled to operate the corresponding ring resonators 353(1)-353(5) at a prescribed optical wavelength. The thermal tuner 357(1) controls the ring resonator 353(1) to operate at the optical wavelength $\lambda 1$. The thermal tuner 357(2) controls the ring resonator 353(2) to operate at the optical wavelength $\lambda 2$. The thermal tuner 357(3) controls the ring resonator 353(3) to operate at the optical wavelength $\lambda 3$. The thermal tuner 357(4) controls the ring resonator 353(4) to operate at the optical wavelength $\lambda 4$. The thermal tuner 357(5) controls the ring resonator 353(5) to operate at the optical wavelength $\lambda 5$. The thermal tuners 357(1)-357(5) are controlled by a ring tuning control circuit 358.

Laser light that includes the five wavelengths $\lambda 1$ to $\lambda 5$ is transmitted from the laser chip 205 through the optical waveguide 213 to the optical port (optical grating coupler) 359 and through an optical waveguide 361. The optical waveguide 361 extends past each of the ring resonators 353(1)-353(5). As the laser light travels through the optical waveguide 361 past a given ring resonators 353(1)-353(5), the wavelengths $\lambda 1$ to $\lambda 5$ of the laser light optically couple into the ring resonators 353(1)-353(5) based on the resonant wavelengths at which the ring resonators 353(1)-353(5) are operated. In this manner, wavelength $\lambda 1$ couples into ring resonator 353(1). Wavelength $\lambda 2$ couples into ring resonator 353(2). Wavelength $\lambda 3$ couples into ring resonator 353(3). Wavelength $\lambda 4$ couples into ring resonator 353(4). Wavelength $\lambda 5$ couples into ring resonator 353(5).

The modulator driver 355(1) receives an electrical data communication stream b0 as an input. The modulator driver 355(2) receives an electrical data communication stream b1 as an input. The modulator driver 355(3) receives an electrical data communication stream b2 as an input. The modulator driver 355(4) receives an electrical data communication stream b3 as an input. The modulator driver 355(5) receives an electrical data communication stream b4 as an input. The modulator drivers 355(1)-335(5) operate to modulate the light coupled into the respective ring resonators 353(1)-353(5) to respectively generate modulated light streams representing the input electrical data communication streams b0-b4, respectively. The modulated light streams travel on through the optical waveguide 361 and through an optical output port 363 (optical grating coupler). The modulator drivers 355(1)-335(5) operate in accordance with clock signals generated by a clock distribution circuit 365.

The five modulated light streams travel from the optical output port 363 through an optical waveguide 367 to a second chip (chip 2) in which an example optical receiver bank 369 operates to demodulate the five modulated light streams of different wavelengths $\lambda 1$ to $\lambda 5$ to in turn generate five electrical data communication streams that match the five electrical data communication streams b0-b4. The five modulated light streams travel from the optical waveguide 367 through an optical input port 371 (optical grating coupler) and into an optical waveguide 373.

The optical receiver bank 369 includes five ring resonators 375(1)-375(5) respectively connected to five receiver circuits 377(1)-377(5). Each of the five ring resonators 375(1)-375(5) has a corresponding resistive thermal tuner (heater) 379(1)-379(5) that is controlled to operate the corresponding ring resonators 375(1)-375(5) at a prescribed optical wavelength. The thermal tuner 379(1) controls the ring resonator 375(1) to operate at the optical wavelength $\lambda 1$. The thermal tuner 379(2) controls the ring resonator 375(2) to operate at the optical wavelength $\lambda 2$. The thermal tuner 379(3) controls the ring resonator 375(3) to operate at the optical wavelength $\lambda 3$. The thermal tuner 379(4) controls the ring resonator 375(4) to operate at the optical wavelength $\lambda 4$. The thermal tuner 379(5) controls the ring resonator 375(5) to operate at the optical wavelength $\lambda 5$. The thermal tuners 379(1)-379(5) are controlled by a ring tuning control circuit 381.

The optical waveguide 373 extends past each of the ring resonators 375(1)-375(5). As the five modulated light streams travel through the optical waveguide 373 past the ring resonators 375(1)-375(5), the wavelengths $\lambda 1$ to $\lambda 5$ of the laser light optically couple into the ring resonators 375(1)-375(5) based on the resonant wavelengths at which the ring resonators 375(1)-375(5) are operated. In this manner, wavelength $\lambda 1$ couples into ring resonator 375(1). Wavelength $\lambda 2$ couples into ring resonator 375(2). Wavelength $\lambda 3$ couples into ring resonator 375(3). Wavelength $\lambda 4$ couples into ring resonator 375(4). Wavelength $\lambda 5$ couples into ring resonator 375(5).

The receiver circuit 377(1) generates the electrical data communication stream b0 as an output based on the light of wavelength $\lambda 1$ coupled into the ring resonator 375(1) from the optical waveguide 373. The receiver circuit 377(2) generates the electrical data communication stream b1 as an output based on the light of wavelength $\lambda 2$ coupled into the ring resonator 375(2) from the optical waveguide 373. The receiver circuit 377(3) generates the electrical data communication stream b2 as an output based on the light of wavelength $\lambda 3$ coupled into the ring resonator 375(3) from the optical waveguide 373. The receiver circuit 377(4) generates the electrical data communication stream b3 as an output based on the light of wavelength $\lambda 4$ coupled into the ring resonator 375(4) from the optical waveguide 373. The receiver circuit 377(5) generates the electrical data communication stream b4 as an output based on the light of wavelength λ5 coupled into the ring resonator 375(5) from the optical waveguide 373. The receiver circuits 377(1)-377(5) operate in accordance with clock signals generated by a clock detection and redistribution circuit 383.

Figure 2F:
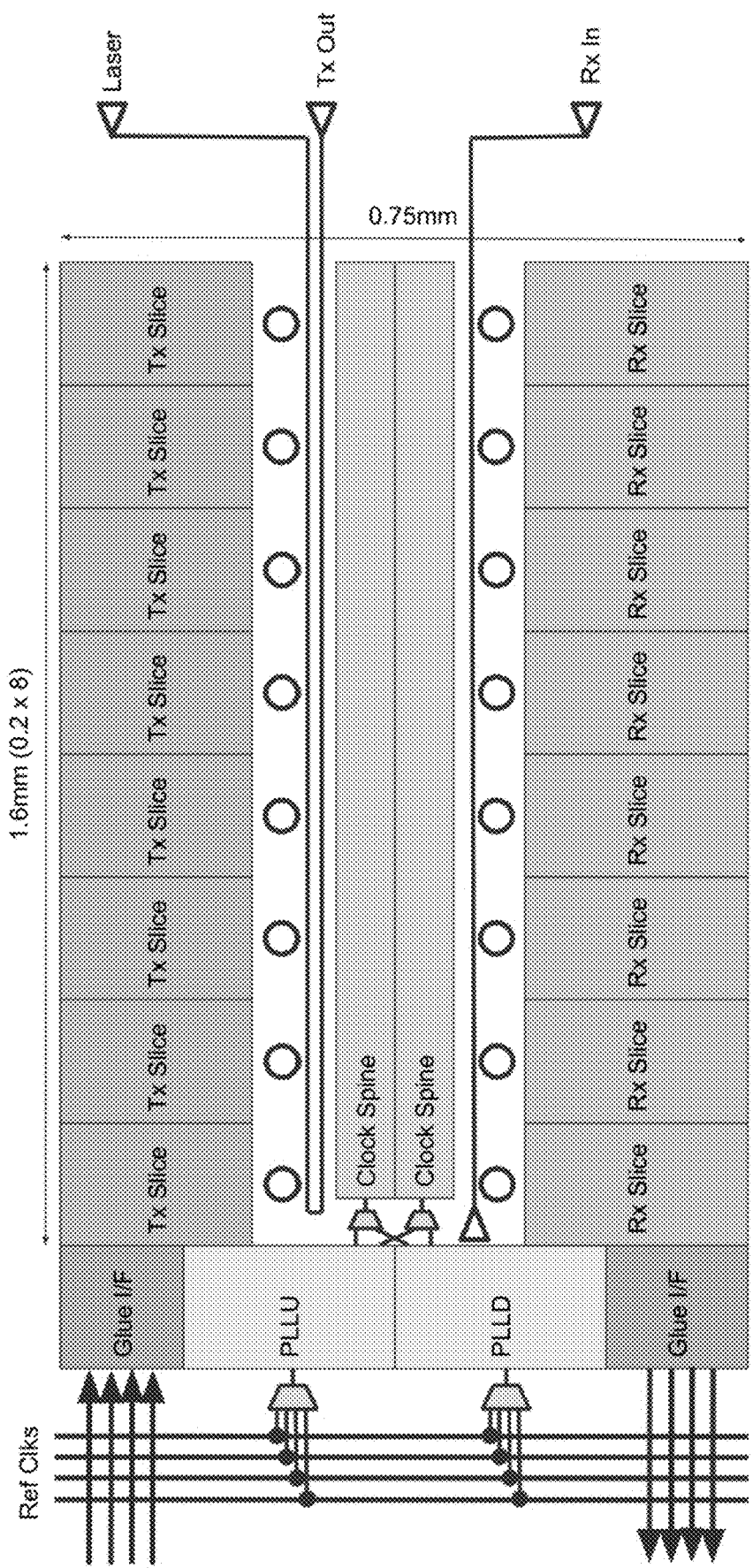
FIG. 2F shows an example transceiver macro implemented within the TeraPHY chip, in accordance with some embodiments.

FIG. 2F shows an example transceiver macro implemented within the TeraPHY chip 203, in accordance with some embodiments. The transceiver macro includes Glue Logic Interfaces (Glue I/F) that include the digital logic required to tie the Optical PHY 287 (Tx and Rx) to the rest of the TeraPHY chip 203. The Glue I/F can include the electrical PHY 286 on the TeraPHY chip 203. The transceiver macro also includes a Phase-Locked Loop Up (PLLU) and a Phase-Locked Loop Down (PLLD). The transceiver macro also includes reference clocks (Ref Clks), which are electrical clock signals used to synchronize operations within the transceiver macro. The transceiver macro also includes a Clock Spine, also referred to as a Clock Tree or a Clock Distribution. The Clock Spine is a set of CMOS circuits that distribute the clock generated by the PLLU/PLLD to the Tx Slices and Rx Slices in the transceiver macro so that operations are appropriately synchronized. A laser input (Laser) fiber-to-chip coupling point (e.g., optical grating coupler, optical edge coupler, etc.) is provided for the transceiver macro. A transmitter output (Tx Out) fiber-to-chip coupling point (e.g., optical grating coupler, optical edge coupler, etc.) is provided for the transceiver macro. A receiver input (Rx In) fiber-to-chip coupling point (e.g., optical grating coupler, optical edge coupler, etc.) is provided for the transceiver macro. The transceiver macro also includes an number Transmitter Slices (Tx Slice). The Tx Slice is a set of circuits that make up the transmit function. Tx Slice components include clock distribution to the channels (such as to channels b0 to b4 shown in FIG. 2E), modulator drivers, modulators (the ring resonators), thermal tuners, and the ring tuning control. The transceiver macro also includes a number of Receiver Slices (Rx Slice). The Rx Slice is a set of circuits that make up the receive function. Rx Slice components include detection and redistribution to the electrical data communication channels (such as to b0 to b4 shown in FIG. 2E), receivers (e.g., CMOS circuits including components such as transimpedance amplifiers, etc.), photodetectors (the ring resonators), and ring tuning control. In various embodiments, the Tx Slices and the Rx Slices in the TeraPHY chip 203 can be implemented in different ways. Some example Tx Slice and Rx Slice implementations are described in Akhter, Mohammad Shahanshah, et al. "WaveLight: A Monolithic Low Latency Silicon-Photonics Communication Platform for the Next-Generation Disaggregated Cloud Data Centers." 2017 IEEE 25th Annual Symposium on High-Performance Interconnects (HOTI). IEEE, 2017, which is incorporated herein by reference in its entirety for all purposes.

Arrayed optical waveguide gratings (AWG) are commonly used as optical (de)multiplexers in wavelength division multiplexed (WDM) systems. Passive AWG's include of an array of optical waveguides of different lengths which determine the frequency channelization of the device. Active AWG's add active thermal tuning to each optical waveguide in order to finely tune the frequency channelization response of the device and stabilize the frequency channelization response against process and temperature variations.

The use of passive AWG's as filtering elements in dense WDM systems is made difficult by process and temperature variations which can cause a shift in AWG channel characteristics. These issues necessitate use of either a first option that includes a WDM system with tunable laser sources that can adapt to the shift in AWG channel characteristics, or a second option that includes a thermally-stabilized AWG that adapts its frequency characteristics to the dense WDM wavelength grid. Both of the above-mentioned first and second options increase the overall cost and energy footprint of the system. Therefore, it is of interest to have additional options for managing effects of process and temperature variations in dense WDM systems. In this regard, the SmartDistribuTOR modules 111-1 through 111-K provide a small (hence cost-effective) and low-energy adaptive optical multiplexer/demultiplexer (mux/demux) solution.

Figure 3:
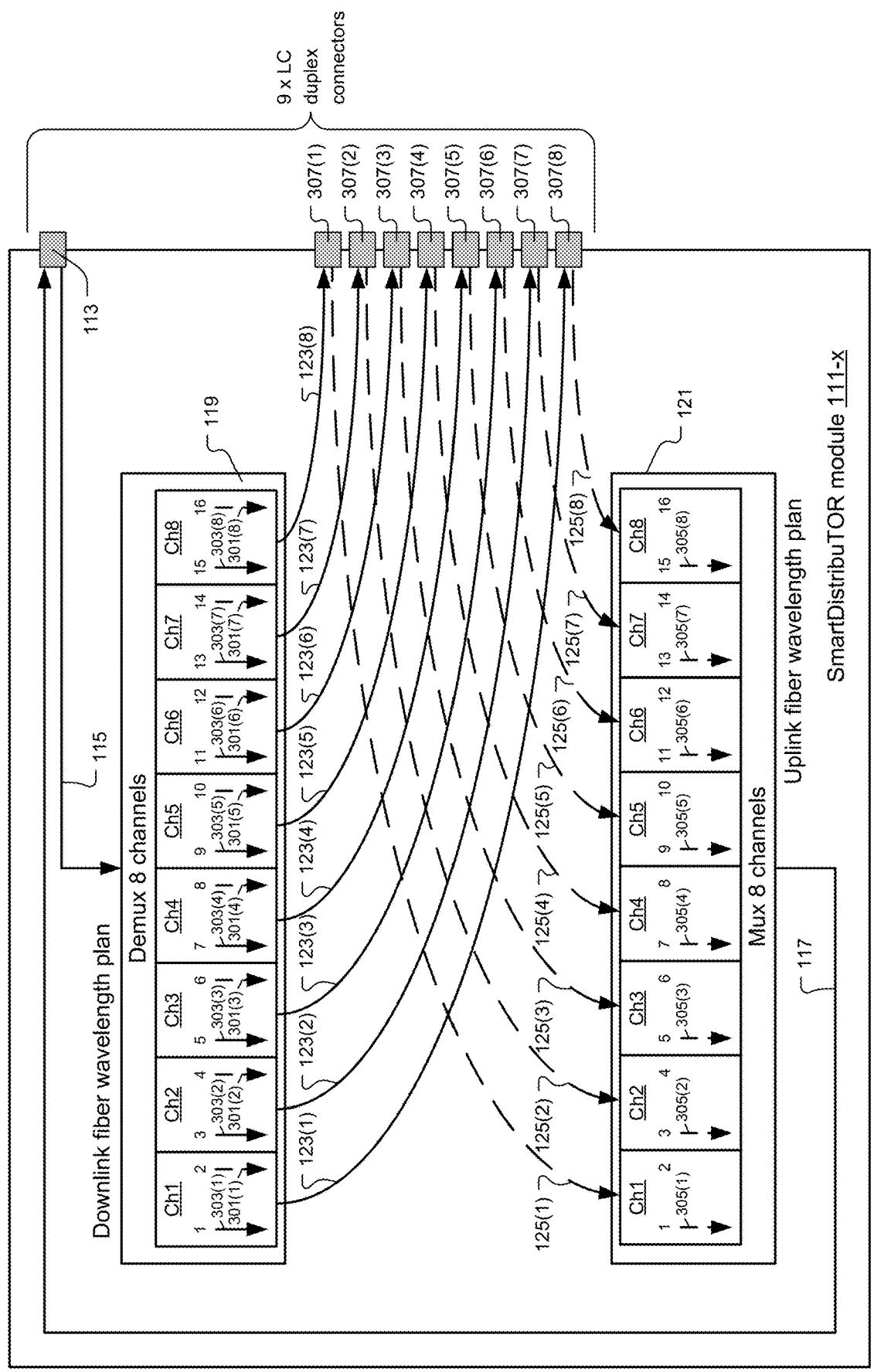
FIG. 3 shows a schematic of one SmartDistribuTOR module with an example downlink fiber wavelength plan for the downlink optical fiber and an example uplink fiber wavelength plan for the uplink optical fiber, in accordance with some embodiments.

FIG. 3 shows a schematic of one SmartDistribuTOR module 111-x, (111-x corresponds to any one of 111-1 through 111-K) with an example downlink fiber wavelength plan for the downlink optical fiber 115 and an example uplink fiber wavelength plan for the uplink optical fiber 117, in accordance with some embodiments. As shown in FIG. 3, the SmartDistribuTOR module 111-x enables splitting and aggregation of wavelengths on multiple optical channels within the optical fiber to multiple optical fibers. In some embodiments, dense WDM can be used to pack a large number of optical channels and increase the number of servers reachable via a single pair of optical fibers, e.g., via the downlink optical fiber 115 and the uplink optical fiber 117.

In some embodiments, the downlink optical fiber 115 and the uplink optical fiber 117 can be connected to the duplex connector 113 exposed at a surface of the SmartDistribuTOR module 111-x. The duplex connector 113 functions to enable connection of two external optical fibers to the downlink optical fiber 115 and the uplink optical fiber 117, respectively. The example embodiment of FIG. 3 shows eight optical channels Ch1 to Ch8 on the downlink optical fiber 115, with one modulated wavelength 301(1)-301(8) per optical channel, respectively, and with one continuous wave wavelength 303(1)-303(8) per optical channel, respectively. Also, the example embodiment of FIG. 3 shows eight optical channels Ch1 to Ch8 on the uplink optical fiber 117, with one modulated wavelength 305(1)-305(8) per optical channel, respectively. In some embodiments, each modulated wavelength 301(1)-301(8) and 305(1)-305(8) can carry 100 Gbps of data, by way of example. In some embodiments, the wavelengths conveyed to and/or from the SmartDistribuTOR module 111-x are in the O-band wavelength range. In some embodiments, the wavelengths conveyed to and/or from the SmartDistribuTOR module 111-x are in the C-band or L-band wavelength range.

FIG. 3 also shows the tunable optical DEMUX block 119 within the SmartDistribuTOR module 111-x, in accordance with some embodiments. The tunable optical DEMUX block 119 is configured to split wavelengths on the multiple optical channels Ch1 to Ch8 within the downlink optical fiber 115 to multiple optical waveguides/fibers 123(1) to 123(8), respectively. Each of the multiple optical waveguides/fibers 123(1)-123(8) is connected to a respective duplex connector 307(1)-307(8) exposed at a surface of the SmartDistribuTOR module 111-x. The duplex connectors 307(1)-307(8) function to enable connection of the optical waveguides/fibers 123(1)-123(8) to corresponding external optical fibers.

FIG. 3 also shows the tunable optical MUX block 121 within the SmartDistribuTOR module 111-x, in accordance with some embodiments. The tunable optical MUX block 121 is configured to aggregate multiple wavelengths from multiple optical waveguides/fibers 125(1)-125(8) onto the multiple optical channels Ch1 to Ch8, respectively, within the uplink optical fiber 117. Each of the multiple optical waveguides/fibers 125(1)-125(8) is connected to a respective one of the duplex connectors 307(1)-307(8) exposed at the surface of the SmartDistribuTOR module 111-x. The duplex connectors 307(1)-307(8) function to enable connection of the optical waveguides/fibers 125(1)-125(8) to corresponding external optical fibers.

Figure 4:
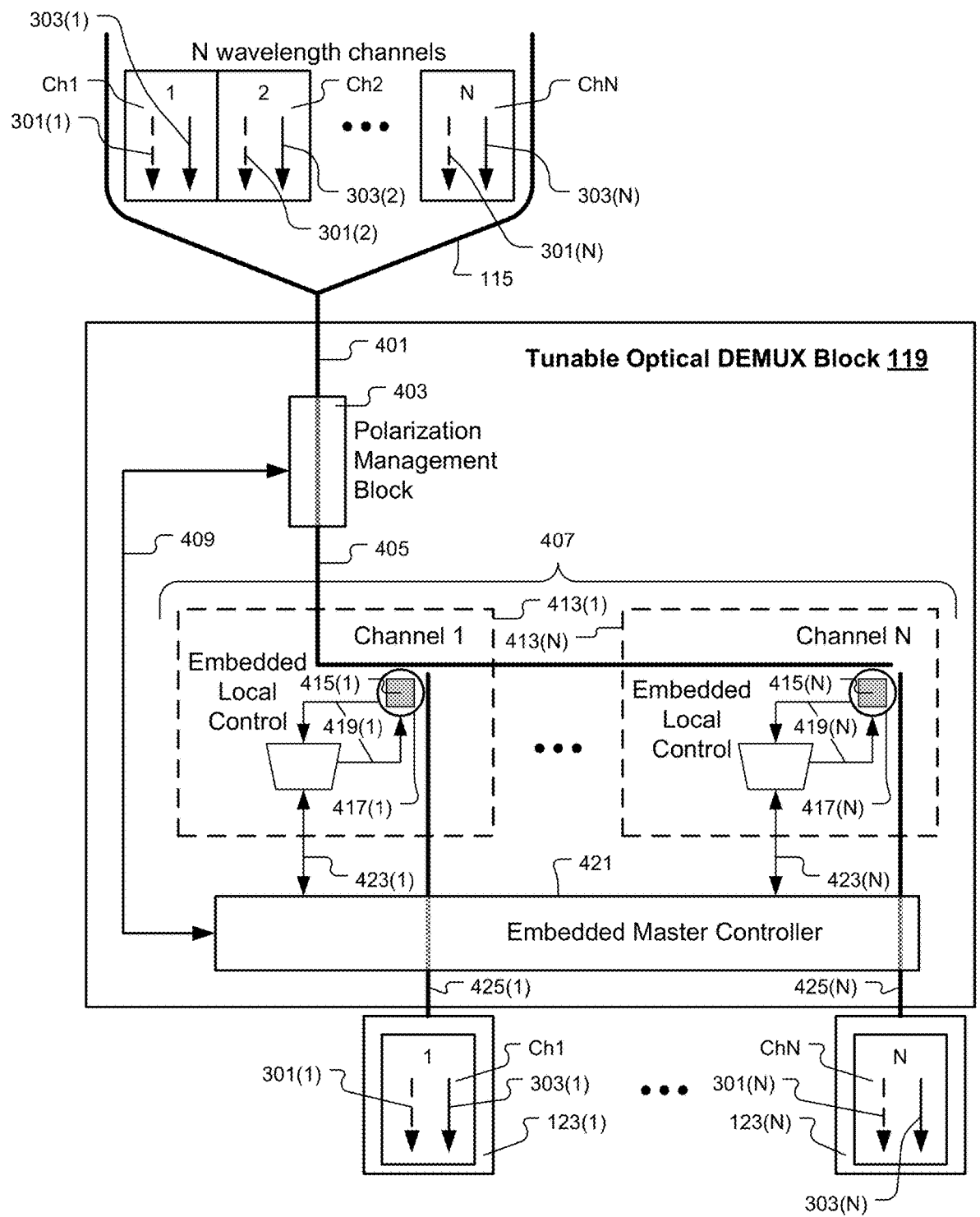
FIG. 4 shows a schematic of the tunable optical DEMUX block within the SmartDistribuTOR module, in accordance with some embodiments.

FIG. 4 shows a schematic of the tunable optical DEMUX block 119 within the SmartDistribuTOR module 111-x, in accordance with some embodiments. The tunable optical DEMUX block 119 includes an input optical waveguide 401. In various embodiments, the input optical waveguide 401 can be an optical fiber or a solid optical waveguide structure formed of silicon, glass, or other suitable optical waveguide material. The input optical waveguide 401 is coupled to receive light incoming from the downlink optical fiber 115. In some embodiments, the polarization of light coming into the tunable optical DEMUX block 119 is unknown, which necessitates a downlink polarization management block 403 to be integrated together with the tunable optical DEMUX block 119 on the same die. In the tunable optical DEMUX block 119, polarization management/control is needed only on the input optical waveguide 401, as shown by the downlink polarization management block 403. In some embodiments, the downlink polarization management block 403 includes a polarization splitting optical grating. In some embodiments, the downlink polarization management block 403 includes a polarization independent optical coupler followed by a polarization splitter-rotator. In some embodiments, after polarization splitting is done by the downlink polarization management block 403, the two paths (polarizations) are combined into a single optical waveguide 405 using a thermally controlled Mach-Zehnder interferometer tuned to maximize the optical power on each wavelength at its output.

The downlink polarization management block 403 is electrically connected to an embedded master controller 421, as indicated by a connection 409. The embedded master controller 421 is configured to control operation of the downlink polarization management block 403 by directing transmission of control signals through the connector 409. The embedded master controller 421 is also configured to receive monitored/measured signals from the downlink polarization management block 403 through the connection 409. It should be understood that the connection 409 can include multiple independent electrical conductors and/or electrical traces in various embodiments.

The tunable optical DEMUX block 119 includes a tunable optical ring resonator filterbank 407 that includes (N) optical ring resonator filters 413(1)-413(N) corresponding to Channel 1 through Channel N, respectively. Each of the optical ring resonator filters 413(1)-413(N) includes at least one ring resonator 417(1)-417(N), respectively, arranged next to the optical waveguide 405 to define a desired channel transfer function. In some embodiments, each of the optical ring resonator filters 413(1)-413(N) includes at least one embedded heating element 415(1)-415(N), respectively, that is connected and configured for control by an embedded electronic control loop 419(1)-419(N), respectively. In some embodiments, the optical ring resonator filters 413(1)-413(N) are designed in a Complementary Metal-Oxide Semiconductor (CMOS) Silicon on Insulator (SOI) process, and are integrated monolithically on the same die as the transistors that comprise the circuitry of the embedded electronic control loops 419(1)-419(N). In some embodiments, each of the optical ring resonator filters 413(1)-413(N) includes a respective embedded photo-detector, which is used/operated as a sensor for wavelength lock.

In some embodiments, a given ring resonator 417(1)-417(N) of a corresponding optical ring resonator filter 413(1)-413(N) is heated by driving electrical current directly through the silicon body of the ring resonator 417(1)-417(N). Because the ring resonator 417(1)-417(N) is resistive, the ring resonator 417(1)-417(N) will heat up when electrical current is driven through it. In these embodiments, a change in the electrical current that is driven through the ring resonator 417(1)-417(N) will occur due to photon-induced carrier generation in the ring resonator 417(1)-417(N). This change in the electrical current due to photon-induced carrier generation in the ring resonator 417(1)-417(N) can be used to sense the proximity of laser wavelength to the resonance wavelength of the ring resonator 417(1)-417(N). In some embodiments, when a given optical ring resonator filter 413(1)-413(N) is heated by driving electrical current directly through the silicon body of the corresponding ring resonator 417(1)-417(N), the embedded heating element 415(1)-415(N) is not disposed and/or used within the given optical ring resonator filter 413(1)-413(N).

In some embodiments, the ring resonator 417(1)-417(N) is a p-i-n doped type of ring structure with the p and n region being the contact regions used to sense the generated photon-induced carriers. In these embodiments, the embedded heating element 415(1)-415(N) can be a separate structure formed outside of the ring resonator 417(1)-417(N). When the ring resonator 417(1)-417(N) is defined as the p-i-n doped type of ring structure, the ring resonator 417(1)-417(N) can be reversed biased to sweep the generated photon-induced charge carriers into a sensing circuit that then drives the embedded electronic control loop 419(1)-419(N) to lock the optical ring resonator filter 413(1)-413(N) to a particular wavelength. Also, in some embodiments, the silicon body of the ring resonator 417(1)-417(N) has defect states that enable generation of photon-induced charge carriers, which is enough to sense the optical power in the ring resonator 417(1)-417(N) without embedding a photodetector.

In some embodiments, each embedded electronic control loop 419(1)-419(N) includes an analog front-end which converts sensed electrical current into a voltage. Also, each embedded electronic control loop 419(1)-419(N) includes a digitizer that generates a digital representation of the voltage output by the analog front-end. Also, each embedded electronic control loop 419(1)-419(N) includes control loop logic and a digital-to-analog converter that outputs electrical current to drive the embedded heating element 415(1)-415(N) or to drive electrical current directly through the silicon body of the ring resonator 417(1)-417(N). In some embodiments, the embedded master controller 421 controls each embedded electronic control loop 419(1)-419(N) through respective electrical connections 423(1)-423(N) to ensure locking of each optical ring resonator filter 413(1)-413(N) to a desired wavelength in the dense WDM spectrum. The resonance wavelengths of the ring resonators 417(1)-417(N) are controlled such that the optical ring resonator filters 413(1)-413(N) optically couple a particular wavelength onto a corresponding output optical waveguide 425(1)-425(N), thereby providing the modulated wavelengths 301(1)-301(N) on the channels Ch1 to ChN, respectively.

Figure 5:
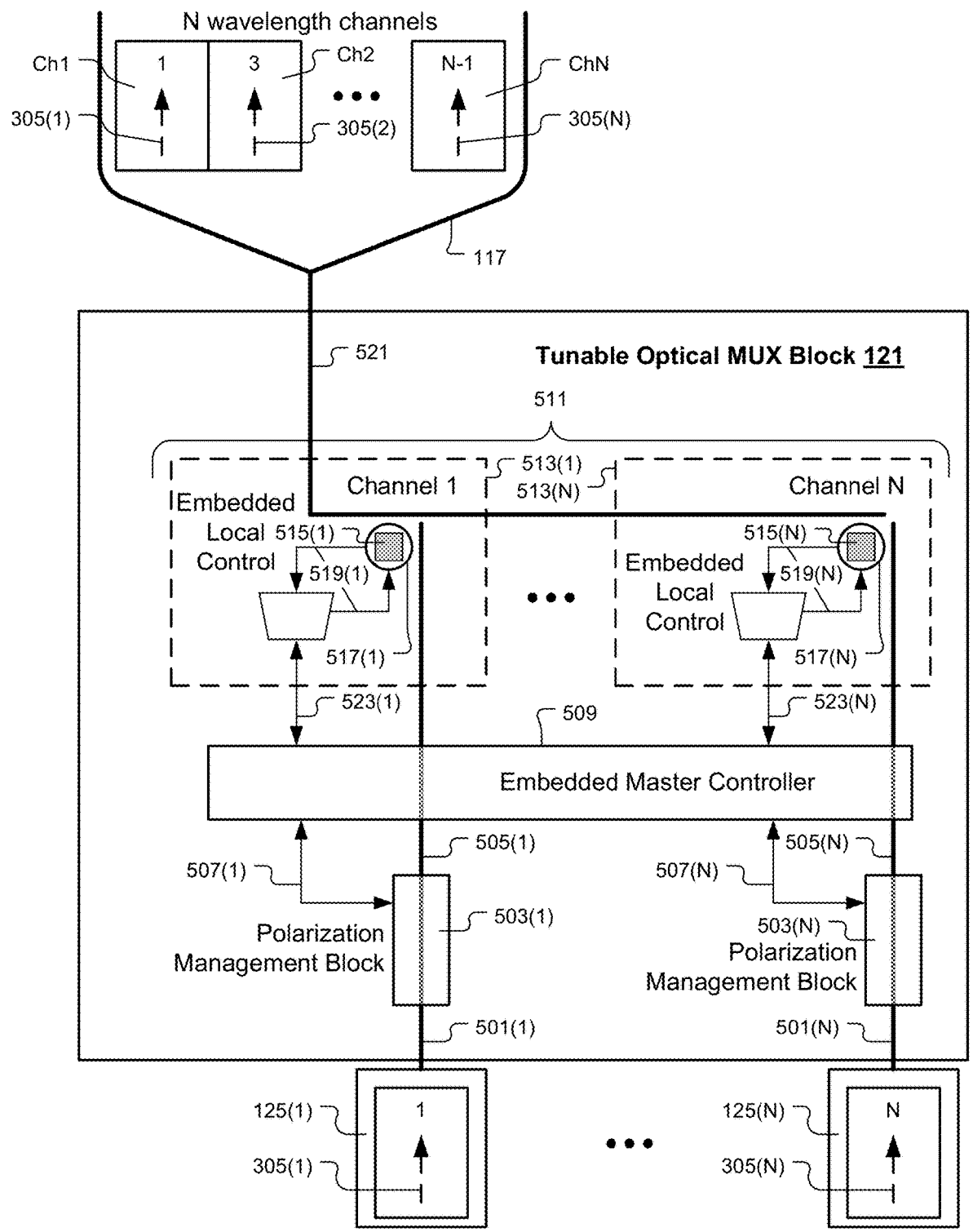
FIG. 5 shows a schematic of the tunable optical MUX block within the SmartDistribuTOR module, in accordance with some embodiments.

FIG. 5 shows a schematic of the tunable optical MUX block 121 within the SmartDistribuTOR module 111-x, in accordance with some embodiments. The tunable optical MUX block 121 includes N input optical waveguides 501(1)-501(N). In various embodiments, each of the input optical waveguides 501(1)-501(N) can be an optical fiber or a solid optical waveguide structure formed of silicon, glass, or other suitable optical waveguide material. Each of the input optical waveguides 501(1)-501(N) is coupled to receive light incoming from the multiple optical waveguides 125(1)-125(N). In some embodiments, the polarization of light coming into the tunable optical MUX block 121 is unknown, which necessitates a number N of polarization management blocks 503(1)-503(N) to be integrated together with the tunable optical MUX block 121 on the same die. In the tunable optical MUX block 121, polarization management/control is provided for each of the input optical waveguides 501(1)-501(N), as shown by the polarization management blocks 503(1)-503(N). In some embodiments, each of the polarization management blocks 503(1)-503(N) includes a polarization splitting optical grating. In some embodiments, each of the polarization management blocks 503(1)-503(N) includes a polarization independent optical coupler followed by a polarization splitter-rotator. In some embodiments, after polarization splitting is done by the polarization management block 503(1)-503(N), the two paths (polarizations) are combined into a single optical waveguide 505(1)-505(N) using a thermally controlled Mach-Zehnder interferometer tuned to maximize the optical power on each wavelength at its output.

Each polarization management block 503(1)-503(N) is electrically connected to an embedded master controller 509, as indicated by electrical connections 507(1)-507(N). The embedded master controller 509 is configured to control operation of the polarization management blocks 503(1)-503(N) by directing transmission of control signals through the connections 507(1)-507(N). The embedded master controller 509 is also configured to receive monitored/measured signals from the polarization management blocks 503(1)-503(N) through the connections 507(1)-507(N). It should be understood that each of the connections 507(1)-507(N) can include multiple independent electrical conductors and/or electrical traces in various embodiments.

The tunable optical MUX block 121 includes a tunable optical ring resonator filterbank 511 that includes (N) optical ring resonator filters 513(1)-513(N) corresponding to Channel 1 through Channel N, respectively. Each of the optical ring resonator filters 513(1)-513(N) includes at least one ring resonator 517(1)-517(N), respectively, arranged next to a respective one of the optical waveguides 505(1)-505(N) to define a desired channel transfer function. In some embodiments, each of the optical ring resonator filters 513(1)-513(N) includes at least one embedded heating element 515(1)-515(N), respectively, that is connected and configured for control by an embedded electronic control loop 519(1)-519(N), respectively. In some embodiments, the optical ring resonator filters 513(1)-513(N) are designed in a CMOS SOI process, and are integrated monolithically on the same die as the transistors that comprise the circuitry of the embedded electronic control loops 519(1)-519(N). In some embodiments, each of the optical ring resonator filters 513(1)-513(N) includes a respective embedded photo-detector, which is used/operated as a sensor for wavelength lock.

In some embodiments, a given ring resonator 517(1)-517(N) of a corresponding optical ring resonator filter 513(1)-513(N) is heated by driving electrical current directly through the silicon body of the ring resonator 517(1)-517(N). Because the ring resonator 517(1)-517(N) is resistive, the ring resonator 517(1)-517(N) will heat up when electrical current is driven through it. In these embodiments, a change in the electrical current that is driven through the ring resonator 517(1)-517(N) will occur due to photon-induced charge carrier generation in the ring resonator 517(1)-517(N). This change in the electrical current due to photon-induced charge carrier generation in the ring resonator 517(1)-517(N) can be used to sense the proximity of laser wavelength to the resonance wavelength of the ring resonator 517(1)-517(N). In some embodiments, when a given optical ring resonator filter 513(1)-513(N) is heated by driving electrical current directly through the silicon body of the corresponding ring resonator 517(1)-517(N), the embedded heating element 515(1)-515(N) is not disposed and/or used within the given optical ring resonator filter 513(1)-513(N).

In some embodiments, the ring resonator 517(1)-517(N) is a p-i-n doped type of ring structure with the p and n region being the contact regions used to sense the generated photon-induced charge carriers. In these embodiments, the embedded heating element 515(1)-515(N) can be a separate structure formed outside of the ring resonator 517(1)-517(N). When the ring resonator 517(1)-517(N) is defined as the p-i-n doped type of ring structure, the ring resonator 517(1)-517(N) can be reversed biased to sweep the generated photon-induced charge carriers into a sensing circuit that then drives the embedded electronic control loop 519(1)-519(N) to lock the optical ring resonator filter 513(1)-513(N) to a particular wavelength. Also, in some embodiments, the silicon body of the ring resonator 517(1)-517(N) has defect states that enable generation of photon-induced charge carriers, which is enough to sense the optical power in the ring resonator 517(1)-517(N) without embedding an actual photodetector.

In some embodiments, each embedded electronic control loop 519(1)-519(N) includes an analog front-end which converts sensed electrical current into a voltage. Also, each embedded electronic control loop 519(1)-519(N) includes a digitizer that generates a digital representation of the voltage output by the analog front-end. Also, each embedded electronic control loop 519(1)-519(N) includes control loop logic and a digital-to-analog converter that outputs electrical current to drive the embedded heating element 515(1)-515(N) or to drive electrical current directly through the silicon body of the ring resonator 517(1)-517(N). In some embodiments, the embedded master controller 509 controls each embedded electronic control loop 519(1)-519(N) through respective electrical connections 523(1)-523(N) to ensure locking of each optical ring resonator filter 513(1)-513(N) to a desired wavelength in the dense WDM spectrum.

The tunable optical ring resonator filterbank 511 operates the (N) optical ring resonator filters 513(1)-513(N) to combine selected ones of the (N) modulated wavelengths 305(1)-305(N) received on the multiple optical waveguides 125(1)-125(N) onto an output optical waveguide 521. In some embodiments, the tunable optical MUX block 121 can be controlled to combine all (N) modulated wavelengths 305(1)-305(N) onto the output optical waveguide 521. In some embodiments, the tunable optical MUX block 121 can be controlled to combine less than all of the (N) modulated wavelengths 305(1)-305(N) onto the output optical waveguide 521, where the particular ones of the modulated wavelengths 305(1)-305(N) that are combined onto the output optical waveguide 521 can be selected through control of the optical ring resonator filters 513(1)-513(N) by way of the embedded master controller 509. The output optical waveguide 521 is optically connected to the uplink optical fiber 117.

In some embodiments, the SmartDistribuTOR module 111-x is autonomous (self-managed) upon power-up. In some embodiments, the SmartDistribuTOR module 111-x can be managed remotely through a microprocessor/microcontroller embedded on the same die/chip or on the same module board as the SmartDistribuTOR module 111-x. In various embodiments, the SmartDistribuTOR module 111-*x* disclosed herein provides for robust, temperature-variation-insensitive, process-variation-insensitive, and polarization-variation-insensitive optical multiplexing and demultiplexing for dense WDM systems. In various embodiments, the SmartDistribuTOR module 111-*x* can operate in either the O-band wavelength range, the C-band wavelength range, or the L-band wavelength range. The SmartDistribuTOR module 111-*x* has low energy consumption and has a small area footprint on the die/chip. In various embodiments, the SmartDistribuTOR module 111-*x* is a self-adaptive system that does not require external control.

In some embodiments, the SmartDistribuTOR module 111-*x* disclosed herein provides a tunable optical multiplexer/demultiplexer based on tunable optical ring resonator filterbank operation with embedded heaters controlled by an electronic control loop. In some embodiments, the electronic control loop has a local per channel controller and global master controller. In some embodiments, the electronic control loop is integrated on the same die/chip as the optical ring resonators. In some embodiments, an embedded optical polarization management block is coupled to the electronic control loop.

In some embodiments, the tunable optical ring resonator filterbank is configured to enable detection of the proximity of the resonance to wavelength by way of charge carrier generation within the passive ring resonator filter. In some embodiments, the passive ring resonator filter has an embedded heater. In some embodiments, the proximity of the resonance to wavelength is detected through a change in heater electrical current. In some embodiments, an embedded photodetector is provided in a small portion/slice of the passive ring resonator filter.

In some embodiments, the SmartDistribuTOR module 111-*x* disclosed herein provides for tunable ring resonator multiplexing/demultiplexing in dense WDM systems to multiplex/demultiplex wavelengths to servers in a server rack. In some embodiments, the SmartDistribuTOR module 111-*x* disclosed herein is located in a top region of the server rack. In some embodiments, the SmartDistribuTOR module 111-*x* provides for multi-ring per channel add/drop of wavelength(s) with embedded resonance control.

In current data-centers, servers are organized in racks. Each rack includes a Top-of-Rack (TOR) switch, which connects the servers in the rack to the rest of the data-center network (typically called the core or the spine). Each server is connected to the TOR switch via copper cables. Optical pluggable transceivers connect the TOR switch with the rest of the data-center network. Systems and methods are disclosed herein that utilize highly integrated electronic-photonic transceiver technology to enable one or more direct optical links from the data-center network to each server, without needing to have the optical source component, i.e., laser, in the server-side electro-optical module. The server-side electro-optical module can be referred to as a Reverb module.

Figure 6:
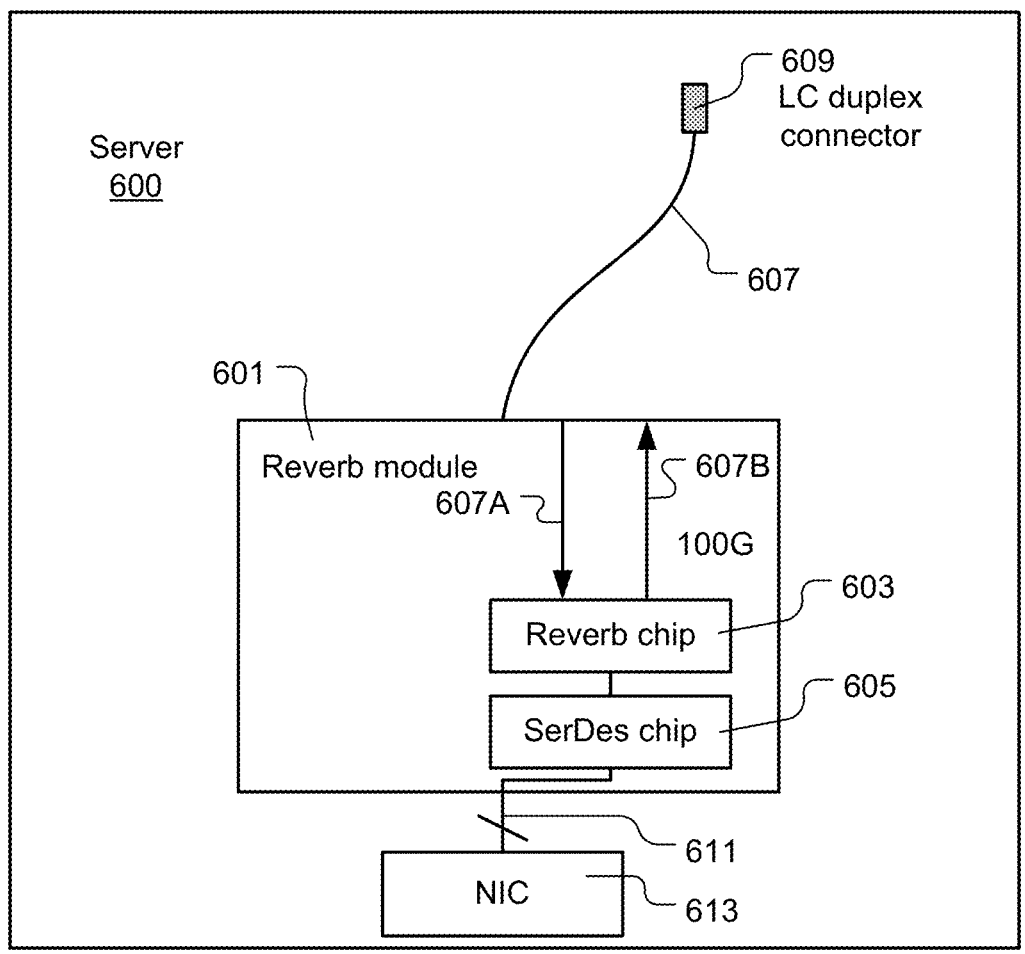
FIG. 6 shows a schematic of a server-side electro-optical module ("Reverb module") within a server, in accordance with some embodiments.

FIG. 6 shows a schematic of a server-side electro-optical module 601 ("Reverb") within a server 600, in accordance with some embodiments. The server 600 represents any of the servers 1 through M shown in FIG. 1. Also, the electro-optical module 601 represents any of the electro-optical modules Rvb-1 through Rvb-M shown in FIG. 1. In some embodiments, the electro-optical module 601 includes a Reverb chip 603 and a SerDes chip 605. In some embodiments, the electro-optical module 601 includes the Reverb chip 603 without the SerDes chip 605. In some embodiments, the Reverb chip 603 includes optical components and electrical components integrated monolithically together on the same die. In some embodiments, the Reverb chip 603 includes only optical components. In some embodiments, the electro-optical module 601 is an active-optical-cable (AOC), where the optical fiber that connects the electro-optical module 601 to the SmartDistribuTOR module 111-*x* in the same rack is directly attached to the Reverb chip 603. In some embodiments, the Reverb chip 603 is optical fiber pigtailed and connectorized at the edge of the electro-optical module 601.

The electro-optical module 601 couples to an optical fiber pair 607 and receives and transmits optical signals on the optical fiber pair 607. In some embodiments, the optical fiber pair 607 is terminated with a connector 609, such as with an LC duplex connector or other suitable type of optical fiber connector. A first optical fiber 607A of the optical fiber pair 607 carries a modulated wavelength with downlink data and one unmodulated (continuous wave (CW)) wavelength to the server 600 on which the electro-optical module 601 is installed. A second optical fiber 607B of the optical fiber pair 607 carries a modulated wavelength with uplink data from the server 600 on which the electro-optical module 601 is installed to the data-center network. In some embodiments, the optical fibers 607A, 607B of the optical fiber pair 607 are directly pigtailed to the Reverb chip 603 in the electro-optical module 601, so as to constitute an Active Optical Cable (AOC). In some embodiments, the Reverb chip 603 is pigtailed and the pigtail is connectorized on a face-plate of the electro-optical module 601 with a connector, such as with an LC duplex connector or other suitable type of optical fiber connector.

The Reverb chip 603 is configured to receive the modulated downlink wavelength and convert the received modulated downlink wavelength to an electrical data stream, and provide the electrical data stream to the server 600 through an electrical bus 611 and a network interface card 613. The Reverb chip 603 is also configured to modulate the received unmodulated (CW) wavelength with uplink data traffic for transmission from the server 600 on which the electro-optical module 601 is installed to the rest of the data-center network. The Reverb chip 603 receives electrical data communication signals from the server 600 through the network interface card 613 an the electrical bus 611. The Reverb chip 603 modulates the unmodulated CW wavelength to generate modulated light that conveys the data included in the electrical data communication signals received from the server 600. In some embodiments, the SerDes chip 605 operates to serialize parallel data received through the electrical bus 611 from the server 600 in route to the Reverb chip 603. Also, in some embodiments, the SerDes chip 605 operates to deserialize serial data into parallel data for transmission through the electrical bus 611 and network interface card 613 to the server 600.

In some embodiments, the Reverb chip 603 is an electronic-photonic chip and includes both photonic components (optical couplers, optical waveguides, optical modulators, photodetectors, optical filters, etc.) and electronic components (transistors, electrical conductors, etc.). In some embodiments in which the Reverb chip 603 is the electronic-photonic chip, the photonic components and the electronic components of the Reverb chip 603 are integrated monolithically on the same die formed in a CMOS fabrication process. In some embodiments, the Reverb chip 603 is configured to include just the photonic components, while the SerDes chip 605 is configured to include the electronic components and circuits that interface and control the photonic Reverb chip 603. In some embodiments in which the Reverb chip 603 is the electronic-photonic chip, the Reverb chip 603 includes electronic circuitry that controls a polarization and a resonant wavelength of the photonic components within the Reverb chip 603. In some embodiments in which the Reverb chip 603 is the electronic-photonic chip, the Reverb chip 603 includes additional non-retimed electronic interface circuitry (such as receivers, modulator drivers, etc.). In some embodiments in which the Reverb chip 603 is the electronic-photonic chip, the Reverb chip 603 also includes retiming electronic circuits (serializer, deserializer, clock generators—phase locked loop and clock-data-recovery loop, etc.).

Figure 7:
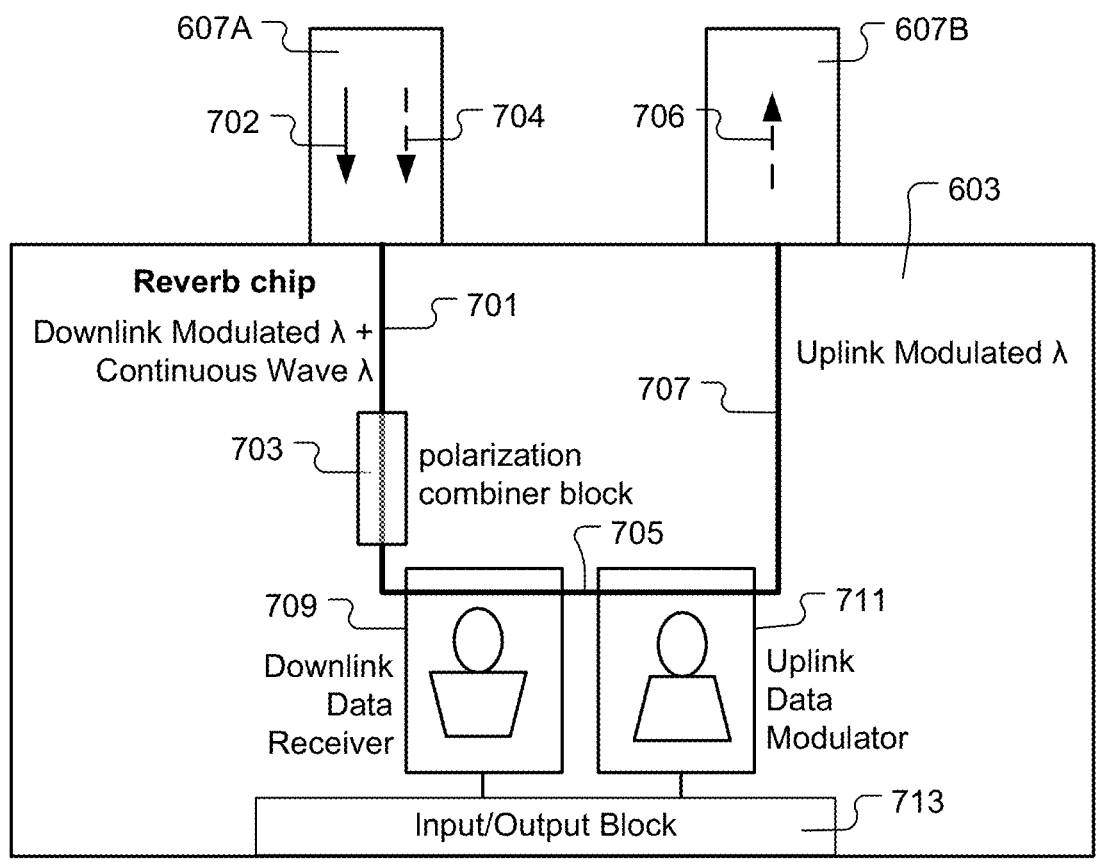
FIG. 7 shows a schematic of the Reverb chip, in accordance with some embodiments.

FIG. 7 shows a schematic of the Reverb chip 603, in accordance with some embodiments. The Reverb chip 603 includes a downlink polarization control block 703, a downlink data receiver block 709, an uplink data modulator block 711, and an electrical input/output (I/O) block 713. The Reverb chip 603 includes an optical waveguide 701 through which the downlink modulated light 704 and the CW light 702 is received from the optical fiber 607A. The downlink polarization control block 703 is optically connected to receive the downlink modulated light 704 and the CW light 702 from the optical waveguide 701. In some embodiments, the downlink polarization block 703 includes a polarization splitting optical grating. In some embodiments, the downlink polarization block 703 includes a polarization independent optical coupler followed by a polarization splitter-rotator. In some embodiments, after polarization split in the downlink polarization block 703, the two paths (polarizations) are combined into a single optical waveguide 705 using a thermally controlled Mach-Zehnder interferometer, tuned to maximize the optical power on each optical wavelength at its output.

In some embodiments, the downlink data receiver block 709 optically couples to an optical output of the downlink polarization control block 703. The downlink data receiver block 709 is configured to filter the downlink modulated wavelength 704 and convert the filtered downlink modulated wavelength 704 into an electrical signal. The downlink data receiver block 709 is also configured to pass the unmodulated (CW) wavelength 702 to the uplink data modulator block 711. The uplink data modulator block 711 is configured to imprint an uplink electrical data stream on the unmodulated (CW) wavelength 702 to create an uplink modulated wavelength light signal 706. The uplink data modulator block 711 is configured to transmit the uplink modulated wavelength light signal 706 through an optical waveguide 707 to the uplink optical fiber 607B.

In some embodiments, the downlink data receiver block 709 includes one or more resonant ring filters configured to drop one or more modulated downlink data wavelengths to one or more corresponding photodetectors. In some embodiments, the corresponding photodetector is integrated in the resonant ring filter. In some embodiments, the resonant ring filter is tuned to the modulated downlink data wavelengths using an embedded heater. In some embodiments, the embedded heater of the resonant ring filter is controlled by an embedded digital control loop which senses the amount of light that the resonant ring drops (or absorbs). In some embodiments, the digital control loop for the embedded heater of the resonant ring filter is placed on another CMOS chip in the electro-optical module 601.

In some embodiments, the uplink data modulator block 711 includes one or more resonant ring modulators. In some embodiments, the resonant ring modulators of the uplink data modulator block 711 are tuned to one or more CW wavelengths using embedded heaters. In some embodiments, the embedded heater of the resonant ring modulator is controlled by an embedded digital control loop which senses the amount of light that the resonant ring drops (or absorbs). In some embodiments, the digital control loop for the embedded heater of the resonant ring modulator is placed on another CMOS chip in the electro-optical module 601.

In some embodiments, the electro-optical module 601 receives one modulated wavelength and one CW wavelength on the downlink optical fiber 607A, and modulates the received CW wavelength from the downlink optical fiber 607A onto the uplink optical fiber 607B. In some embodiments, the electro-optical module 601 receives multiple modulated wavelengths and multiple CW wavelengths on the downlink optical fiber 607A, and modulates the received CW wavelengths from the downlink optical fiber 607A onto the uplink optical fiber 607B. In some embodiments, the electro-optical module 601 is configured to receive optical signals from multiple downlink optical fibers 607A and provide optical signals to multiple uplink optical fibers 607B. In these embodiments, each of the multiple downlink optical fibers 607A conveys one or more modulated wavelength(s) and one or more unmodulated CW wavelength(s) to the electro-optical module 601, and each of the multiple uplink optical fibers 607B conveys one or more modulated wavelength(s) from the electro-optical module 601. In some embodiments, the wavelengths conveyed to and/or from the electro-optical module 601 are in the O-band wavelength range. In some embodiments, the wavelengths conveyed to and/or from the electro-optical module 601 are in the C-band or L-band wavelength range.

Figure 8:
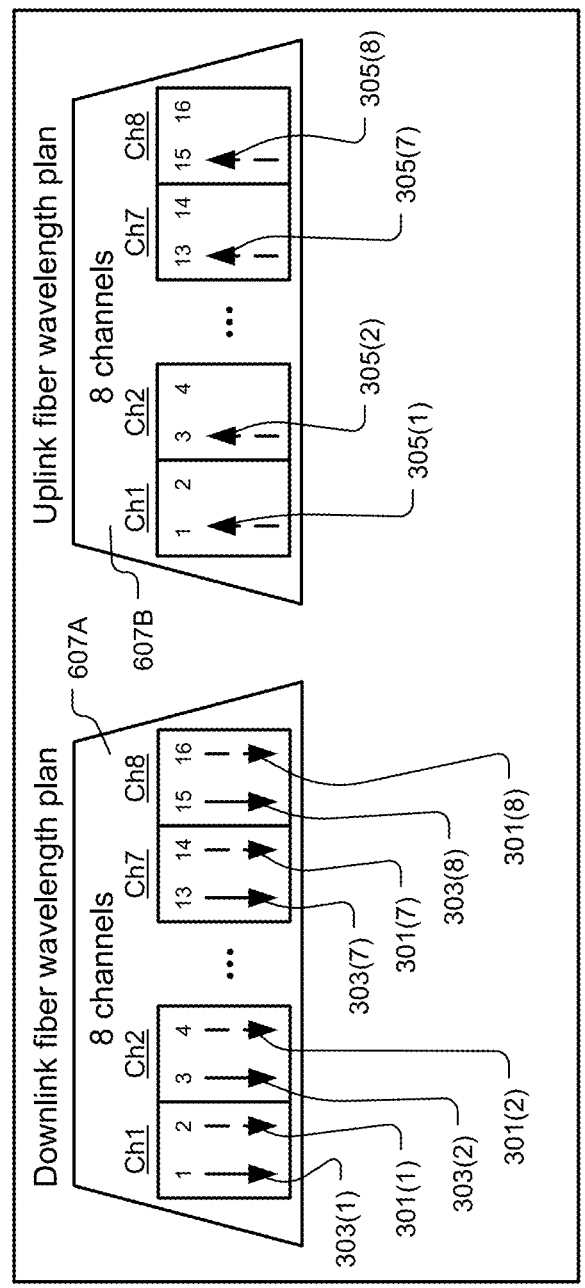
FIG. 8 shows an example uplink and downlink wavelength plan per downlink optical fiber and uplink optical fiber, in accordance with some embodiments.

FIG. 8 shows an example uplink and downlink wavelength plan per downlink optical fiber 607A and uplink optical fiber 607B, in accordance with some embodiments. In some embodiments, dense wavelength division multiplexing can be used to pack a large number of optical channels and increase the number of servers reachable via a single uplink and downlink optical fiber pair 607. The example embodiment of FIG. 8 shows eight optical channels Ch1 to Ch8 on the downlink fiber 607A, with one modulated wavelength 301(1)-301(8) per optical channel, respectively, and with one continuous wave wavelength 303(1)-303(8) per optical channel, respectively. Also, the example embodiment of FIG. 8 shows eight optical channels Ch1 to Ch8 on the uplink fiber 607B, with one modulated wavelength 305(1)-305(8) per optical channel, respectively. In some embodiments, each modulated wavelength 301(1)-301(8) and 305(1)-305(8) can carry 100 Gbps of data, by way of example. In various embodiments, a passive or active optical multiplexer/demultiplexer, such as the SmartDistribuTOR module 111-x, separates one or more channels to be forwarded to the electro-optical module 601 in each server.

It should be understood that the electro-optical module 601 enables high-bandwidth, low-energy and low-cost optical connection from each server to the data-center network by leveraging advances in electronic-photonic integration in CMOS and low-cost dense wavelength division multiplexing (DWDM). Miniaturization of optical components in standard CMOS chips and temperature control of those components using on-chip digital logic for auto-feedback loops enables a reliable, low-cost, and high-bandwidth system for connecting racks of servers. This interconnectivity of thousands of servers enables disaggregation of compute, memory, and storage resources across many racks, making flexible real-time allocation of compute jobs across racks possible.

In various embodiments, the electro-optical module 601 provides for having no lasers in the servers 1 through M, because of continuous wave laser light forwarding from the TORminator module 107 through the SmartDistribuTOR module 111-x to the electro-optical module 601 in the server. The electro-optical module 601 also provides for a ubiquitous server-side module in that any server module can work at any DWDM wavelength in the wavelength range of interest (e.g., O-band). The electro-optical module 601 also provides for operation over standard duplex single mode (SM) optical fiber pairs, with a single fiber pair connection to server. The electro-optical module 601 also provides for scalability through parallel transmission and processing of different wavelengths of light.

In some embodiments, the electro-optical module 601 does not have an onboard laser, but rather is configured to receive at least one CW wavelength and at least one modulated wavelength. The electro-optical module 601 is configured to modulate the CW wavelength for uplink data transmission. The electro-optical module 601 includes the Reverb chip 603 that can include silicon-photonic components. In some embodiments, the Reverb chip 603 can include monolithically integrated transistors and photonic components. In some embodiments, the Reverb chip 603 can include photonic resonant components with embedded heaters. In some embodiments, the Reverb chip 603 can include photonic resonant components and embedded tuning circuits. In some embodiments, the Reverb chip 603 can include photonic resonant components and embedded tuning circuits, along with photonic link transceivers (receivers and modulator drivers). In some embodiments, the Reverb chip 603 can include photonic resonant components and embedded tuning circuits, along with photonic link transceivers (receivers and modulator drivers), and a retimed interface (serializer and deserializer). In some embodiments, the Reverb chip 603 can include photonic resonant components and embedded tuning circuits, and photonic link transceivers (receivers and modulator drivers), and a retimed interface (serializer and deserializer), and a clock and data-recover loop. In some embodiments, the Reverb chip 603 includes active polarization control/combining in the Reverb chip 603. In some embodiments, the Reverb chip 603 includes a polarization splitting coupler. In some embodiments, the Reverb chip 603 includes a polarization independent coupler and a polarization splitter/rotator.

In some embodiments, the Reverb chip 603 includes one or more resonant filters to drop the modulated downlink wavelengths. In some embodiments, the one or more resonant filters include passive, tunable ring filters. In some embodiments, the one or more resonant filters include active, tunable, ring-resonator-based photodetectors. In some embodiments, the Reverb chip 603 includes one or more tunable resonant modulators to modulate the received CW wavelengths for the uplink data.

Figure 9:
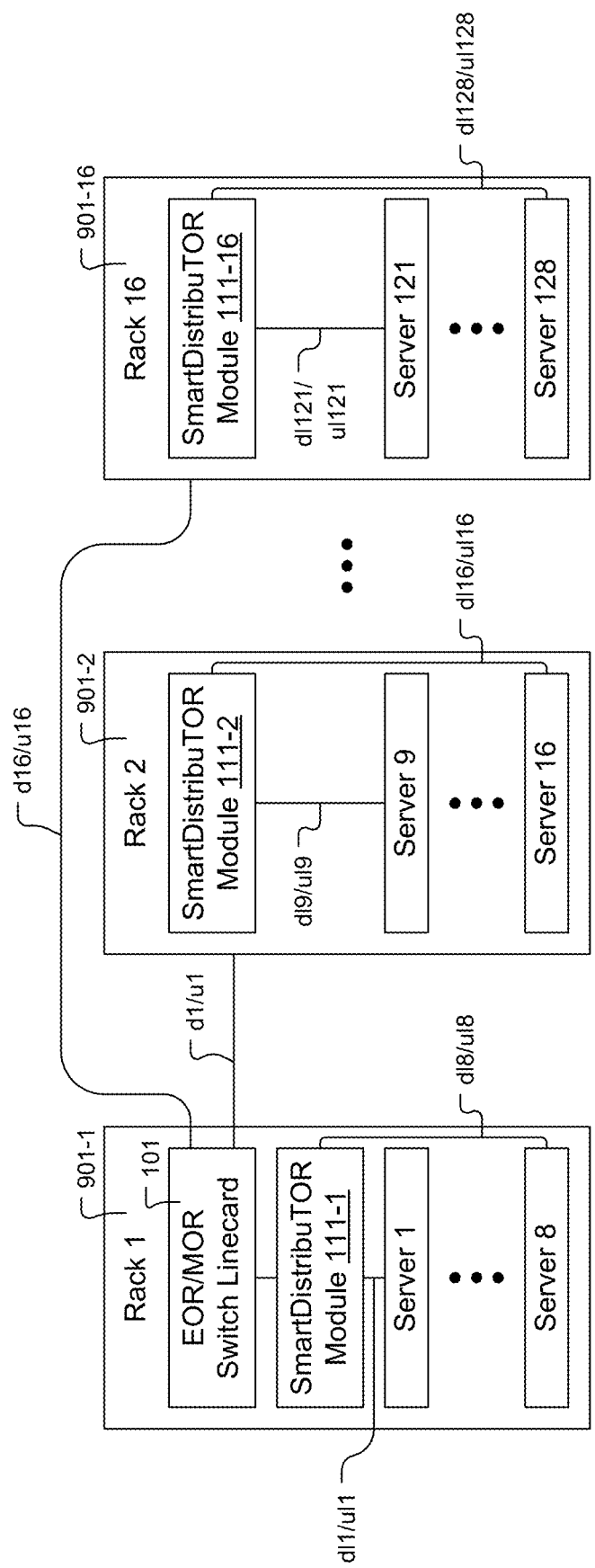
FIG. 9 shows the TORminator system implemented across multiple racks within a datacenter, in accordance with some embodiments.

FIG. 9 shows the TORminator system 100 implemented across multiple racks within a datacenter, in accordance with some embodiments. The example of FIG. 9 corresponds to the TORminator system 100 example of FIG. 1. Therefore, 128 servers (M=128) are distributed across 16 racks (K=16) 901-1 to 901-16, with each rack including a separate SmartDistribuTOR module 111-1 to 111-16 and 8 servers (N=8). One rack (rack 901-1 in the example of FIG. 9) includes the EOR/MOR switch linecard 101 that services all 16 racks 901-1 to 901-16. In this configuration, the TORminator system 100 provides for optical data communication between the EOR/MOR switch linecard 101 and each of the 128 servers in the 16 racks.

It should be understood that the TORminator system 100 disclosed herein creates large pools of highly interconnected servers by leveraging advances in electronic-photonic integration in CMOS and low-cost dense wavelength division multiplexing (DWDM) in the O-band wavelength range. Miniaturization of optical components in standard CMOS chips and robust lock control of those components enable a reliable, low-cost, and high-bandwidth TORminator system 100 for optically connecting multiple racks of servers. It should be understood that the TORminator system 100 disclosed herein can be scaled to interconnect thousands of servers. This interconnectivity of thousands of servers enables disaggregation of compute, memory, and storage resources across many racks, making flexible real-time allocation of compute jobs across racks possible.

In various embodiments, the TORminator system 100 disclosed herein provides for low optical fiber count due to efficient wavelength mux-demux for dense wavelength-division multiplexing in the O-band (O-DWDM).

In various embodiments, the TORminator system 100 disclosed herein provides for optical communication between multiple servers without having lasers in the multiple servers, because the laser light forwarding from the TORminator module 107 through the SmartDistribuTOR modules 111-x to the servers. The TORminator system 100 also provides a ubiquitous server-side electro-optical module 601 that can work at any O-DWDM wavelength. The TORminator system 100 also provides for operation over standard duplex single mode optical fiber pairs. In some embodiments, the TORminator system 100 also provides a low-power system with uncooled lasers within the laser chip 205 in the TORminator module 107 on the EOR/MOR switch linecard 101. The TORminator system 100 also provides a pluggable architecture with options for in-package integration of the TeraPHY chip 203 with a switch chip (ASIC) within the rack switch 103. The TORminator system 100 also provides for scalability through parallel transmission and processing of different wavelengths of light.

In some embodiments, the TORminator system 100 includes the TORminator module 107 in electrical data communication with the rack switch 103, and the TORminator module 107 in optical data communication with the SmartDistribuTOR module 111-x, and the SmartDistribuTOR module 111-x in optical data communication with the electro-optical modules 601 of servers. The TORminator system 100 provides for forwarding of laser light to the servers for optical uplink of data (even without the top-of-the-rack optical mux/demux). The TORminator system 100 also provides for multiple channels per optical fiber (one or more for each server). The TORminator system 100 also provides for no laser or optical amplifier at the server side.

In some embodiments, the TORminator module 107 includes the TeraPHY chip 203 and the laser chip 205. In some embodiments, the TORminator module 107 can provide the SOA array chip 207 on the downlink. In some embodiments, the TORminator module 107 can provide the SOA array chip 209 on the uplink (capable of handling both polarizations). In some embodiments, the TORminator module 107 can provide both the SOA array chip 207 on the downlink and the SOA array chip 209 on the uplink (capable of handling both polarizations). In some embodiments, the TORminator module 107 is edge-connector pluggable. In some embodiments, the TORminator module 107 is on a mezzanine card. In some embodiments, one or more components of the TORminator module 107 are directly socketed on the EOR/MOR switch linecard 101. In some embodiments, the TeraPHY chip 203 of the TORminator module 107 is co-packaged with the switch chip within the rack switch 103, while the laser chip 205 and SOA array chips 207, 209 of the TORminator module 107 are either in the TORminator module 107 or socketed on the EOR/MOR switch linecard 101.

In some embodiments, the TeraPHY chip 203 of the TORminator module 107 includes multiple transceiver macros, with each transceiver macro being of multiple wavelength slices. In some embodiments, the slices of the TeraPHY chip 203 include electrical and optical components (transmit and receive macro slices). In some embodiments, an electrical link between the TeraPHY chip 203 and the switch chip in the rack switch 103 is retimed. In some embodiments, an electrical link between the TeraPHY chip 203 and the switch chip in the rack switch 103 is not retimed. In some embodiments, the slices of the TeraPHY chip 203 include only optical components. In some embodiments, modulator slices of the TeraPHY chip 203 modulate a portion of the laser light wavelengths provided by the laser chip 205 and leave a remainder of the laser light wavelengths provided by the laser chip 205 for use by the servers to uplink data.

In some embodiments, a data communication system includes a rack switch 103, a TORminator module 107, a downlink optical fiber d1 to dK, an uplink optical fiber u1 to uK, and a SmartDistribuTOR module 111-*x*. The TORminator module 107 is electrically connected to the rack switch 103. The TORminator module 107 is configured to convert a number (N) of downlink data communication electrical signals received from the rack switch 103 into corresponding N downlink data communication optical signals, where N is greater than one. Each of the N downlink data communication optical signals has a different optical wavelength. The TORminator module 107 is configured to simultaneously direct the N downlink data communication optical signals to a first downlink optical port (half of each of 109-1 to 109-K). The TORminator module 107 is configured to generate N different wavelengths of continuous wave laser light and simultaneously direct the N different wavelengths of continuous wave laser light to the first downlink optical port (half of each of 109-1 to 109-K). The TORminator module 107 includes a first uplink optical port (half of each of 109-1 to 109-K). The TORminator module 107 is configured to convert N uplink data communication optical signals received through the first uplink optical port (half of each of 109-1 to 109-K) into N uplink data communication electrical signals. The TORminator module 107 is configured to transmit the N uplink data communication electrical signals to the rack switch 103.

The downlink optical fiber d1 to dK has a first end optically coupled to the first downlink optical port (half of each of 109-1 to 109-K) of the TORminator module 107. The uplink optical fiber u1 to uK has a first end optically coupled to the first uplink optical port (half of each of 109-1 to 109-K) of the TORminator module 107. The SmartDistribuTOR module 111-*x* has a second downlink optical port (half of 113), a second uplink optical port (half of 113), N server downlink optical ports S1*d* to SNd, and N server uplink optical ports S1*u* to SNu. The downlink optical fiber d1 to dK has a second end optically coupled to the second downlink optical port (half of 113). The uplink optical fiber u1 to uK has a second end optically coupled to the second uplink optical port (half of 113). The SmartDistribuTOR module 111-*x* is configured to respectively direct the N downlink data communication optical signals and the N different wavelengths of continuous wave laser light received through the second downlink optical port (half of 113) to the N server downlink optical ports S1*d* to SNd. The SmartDistribuTOR module 111-*x* is also configured to simultaneously direct N uplink data communication optical signals received through the N server uplink optical ports S1*u* to SNu to the second uplink optical port (half of 113).

In the data communication system, each of N servers is optically connected to a respective one of the N server downlink optical ports S1*d* to SNd of the SmartDistribuTOR module 111-*x* and to a respective one of the N server uplink optical ports S1*u* to SNu of the SmartDistribuTOR module 111-*x*. Each of the N servers includes a reverb module 601 having an optical input port 607A and an optical output port 607B. The optical input port 607A of the reverb module 601 optically connected to the respective one of the N server downlink optical ports S1*d* to SNd of the SmartDistribuTOR module 111-*x*. The optical output port 607B of the reverb module 601 optically connected to the respective one of the N server uplink optical ports S1*u* to SNu of the SmartDistribuTOR module 111-*x*. The reverb module 601 configured to convert a respective one of the N downlink data communication optical signals 704 received through the optical input port 607A into a corresponding downlink data communication electrical signal for processing by the corresponding one of the N servers that includes the reverb module 601. The reverb module 601 configured to convert an uplink data communication electrical signal provided by the corresponding one of the N servers that includes the reverb module into an uplink data communication optical signal 706 for transmission through the optical output port 607B of the reverb module 601.

In some embodiments, the reverb module 601 is configured to modulate a respective one of the N different wavelengths of continuous wave laser light 702 received through the optical input port 607A to convert the uplink data communication electrical signal provided by the corresponding one of the N servers into the uplink data communication optical signal 706 for transmission through the optical output port 607B of the reverb module 601.

In some embodiments, the reverb module 601 includes the serializer/deserializer (SerDes) chip 605 configured to deserialize serial downlink data within the corresponding downlink data communication electrical signal that is converted from the respective one of the N downlink data communication optical signals 704 received through the optical input port 607A to obtain parallel downlink data for processing by the corresponding one of the N servers that includes the reverb module 601. In some embodiments, the SerDes chip 605 of the reverb module 601 is configured to serialize parallel uplink data provided by the corresponding one of the N servers that includes the reverb module 601 to generate the uplink data communication electrical signal prior to modulation of the respective one of the N different wavelengths of continuous wave laser light 702 received through the optical input port 607A in order to convert the uplink data communication electrical signal into the uplink data communication optical signal 706 for transmission through the optical output port 607B of the reverb module 601.

In some embodiments, the TORminator module 107 includes the SerDes chip 201 connected to the rack switch 103. The SerDes chip 201 is configured to serialize parallel downlink data received from the rack switch 103. The SerDes chip 301 is also configured to deserialize serial uplink data within the N uplink data communication electrical signals for transmission to the rack switch 103. Also, in some embodiments, the TORminator module 107 includes the laser chip 205 configured and connected to generate the N different wavelengths of continuous wave laser light. In some embodiments, the TORminator module 107 includes the optical amplifier (SOA) chip 207 configured and connected to amplify the N downlink data communication optical signals prior to being directed to the first downlink optical port (half of each of 109-1 to 109-K). In some embodiments, the TORminator module 107 includes an optical amplifier (SOA) chip 209 configured and connected to amplify the N uplink data communication optical signals received through the first uplink optical port (half of each of 109-1 to 109-K).

In some embodiments, the SmartDistribuTOR module 111-x is configured to direct the N downlink data communication optical signals received through the second downlink optical port (half of 113) into N separate optical channels Ch1 to ChN, and the SmartDistribuTOR module 111-x is configured to direct the N different wavelengths of continuous wave laser light received through the second downlink optical port (half of 113) into the N separate optical channels Ch1 to ChN, such that each of the N separate optical channels Ch1 to ChN includes a different one of the N downlink data communication optical signals and a different one of the N different wavelengths of continuous wave laser light. The SmartDistribuTOR module 111-x is also configured to aggregate the N uplink data communication optical signals onto a single optical waveguide 117 for transmission through the second uplink optical port (half of 113). In some embodiments, the number N of separate optical channels Ch1 to ChN is 8.

In some embodiments, the TORminator module 107 is configured and connected to receive a number (M) of downlink data communication electrical signals from the rack switch 103, where M is an integer (K) multiple of N, i.e., M=(K)(N). The TORminator module 107 is configured to convert the M downlink data communication electrical signals into corresponding M downlink data communication optical signals. The M downlink data communication optical signals are distributed into K sets of N downlink data communication optical signals per set. Each of the N downlink data communication optical signals in a given one of the K sets has a different optical wavelength. The TORminator module 107 is configured to simultaneously direct the N downlink data communication optical signals in a given one of the K sets to a respective one of K downlink optical ports (half of each of 109-1 to 109-K) of the TORminator module 107. The TORminator module 107 is configured to simultaneously direct the N different wavelengths of continuous wave laser light to each of the K downlink optical ports (half of each of 109-1 to 109-K) of the TORminator module 107. The TORminator module 107 includes K uplink optical ports (half of each of 109-1 to 109-K). The TORminator module 107 configured to convert N uplink data communication optical signals received through each of the K uplink optical ports (half of each of 109-1 to 109-K) into N uplink data communication electrical signals to constitute M uplink data communication electrical signals. The TORminator module 107 configured to transmit the M uplink data communication electrical signals to the rack switch 103. In some embodiments, K is 16, N is 8, and M is 128. However, in other embodiments, K is greater or less than 16, and/or N is greater or less than 8, and M equals N multiplied by K.

In some embodiments, each of K downlink optical fibers d1 to dK has a first end optically coupled to a respective one of the K downlink optical ports (half of each of 109-1 to 109-K) of the TORminator module 107. And, each of K uplink optical fibers u1 to uK has a first end optically coupled to a respective one of the K uplink optical ports (half of each of 109-1 to 109-K) of the TORminator module 107. Also, each of the K downlink optical fibers d1 to dK has a second end optically coupled to a downlink optical port (half of 113) of a respective one of the K SmartDistribuTOR modules 111-1 to 111-K. Also, each of the K uplink optical fibers u1 to uK has a second end optically coupled to an uplink optical port (half of 113) of a respective one of the K SmartDistribuTOR modules 111-1 to 111-K. Each of the K SmartDistribuTOR modules 111-1 to 111-K has N server downlink optical ports S1d to SNd and N server uplink optical ports S1u to SNu. Each of the K SmartDistribuTOR modules 111-1 to 111-K is configured to respectively direct the N downlink data communication optical signals and the N different wavelengths of continuous wave laser light received through its downlink optical port (half of 113) to its N server downlink optical ports S1d to SNd. Each of the K SmartDistribuTOR modules 111-1 to 111-K is configured to simultaneously direct N uplink data communication optical signals received through its N server uplink optical ports S1u to SNu to its uplink optical port (half of 113).

Each of the N server downlink optical ports S1d to SNd of a given one of the K SmartDistribuTOR modules 111-1 to 111-K is optically connected to an optical input of a different server in a set of N servers. Each of the N server uplink optical ports S1u to SNu of the given one of the K SmartDistribuTOR modules 111-1 to 111-K is optically connected to an optical input of a different server in the set of N servers. In some embodiments, the given one of the K SmartDistribuTOR modules 111-1 to 111-K and the set of N servers are disposed in a same rack. In some embodiments, the K SmartDistribuTOR modules 111-1 to 111-K are collectively connected to optical inputs and optical outputs of M different servers. In some embodiments, the K SmartDistribuTOR modules 111-1 to 111-K and the M different servers are distributed across K racks, with each of the K racks including a different one of the K SmartDistribuTOR modules 111-1 to 111-K and a unique set of N servers of the M different servers. Also, the TORminator module 107 is disposed in one of the K racks.

In some embodiments, an optical multiplexer/demultiplexer module is disclosed. This optical multiplexer/demultiplexer module is referred to herein as the SmartDistribuTOR module 111-x. The SmartDistribuTOR module 111-x includes a downlink optical port (half of 113), an uplink optical port (half of 113), a number (N) of server downlink optical ports S1d to SNd, N server uplink optical ports S1u to SNu, an optical demultiplexer 119, and an optical multiplexer 121. The optical demultiplexer 119 is configured to separate N downlink data communication optical signals received through the downlink optical port (half of 113) based on optical wavelength. The optical demultiplexer 119 is configured to respectively direct the N downlink data communication optical signals to the N server downlink optical ports S1d to SNd. The optical demultiplexer 119 is also configured to separate N different wavelengths of continuous wave laser light received through the downlink optical port (half of 113) based on optical wavelength. The optical demultiplexer 119 configured to respectively direct the N different wavelengths of continuous wave laser light to the N server downlink optical ports S1d to SNd. The optical multiplexer 121 is configured to aggregate N uplink data communication optical signals received through the N server uplink optical ports S1u to SNu onto a single optical waveguide 117 optically coupled to the uplink optical port (half of 113).

Each of the N server downlink optical ports S1d to SNd is optically coupled to a respective one of N servers, and each of the N server uplink optical ports S1u to SNu is optically coupled to a respective one of the N servers. In some embodiments, the SmartDistribuTOR module 111-x and the N servers are disposed within a same rack. In some embodiments, the N different wavelengths of continuous wave laser light are generated by the laser chip 205 disposed separate from the SmartDistribuTOR module 111-x. The SmartDistribuTOR module 111-x is configured to separate the N downlink data communication optical signals into N separate optical channels. The SmartDistribuTOR module 111-x is also configured to separate the N different wavelengths of continuous wave laser light into the N separate optical channels. In this manner, each of the N separate optical channels includes a different one of the N downlink data communication optical signals and a different one of the N different wavelengths of continuous wave laser light. In some embodiments, the value of N is 8. However, in other embodiments, the value of N is either greater than or less than 8.

In some embodiments, the SmartDistribuTOR module 111-x includes a downlink polarization control device 403 configured to split light received through downlink optical port (half of 113) into a first polarization of light and a second polarization of light. In some embodiments, the downlink polarization control device 403 includes a polarization splitting optical grating. In some embodiments, the downlink polarization control device 403 includes a polarization independent optical coupler having an optical output coupled to an optical input of a polarization splitter-rotator. In some embodiments, the downlink polarization control device 403 includes a thermally controlled Mach-Zehnder interferometer configured to combine the first polarization of light and the second polarization of light onto the single optical waveguide 405.

In some embodiments, the optical demultiplexer 119 includes the tunable optical ring resonator filterbank 407 that includes N optical ring resonator filters 413(1) to 413(N). Each of the N optical ring resonator filters 413(1) to 413(N) includes at least one ring resonator 417(1) to 417(N) configured to drop one or more wavelengths of the N downlink data communication optical signals to a photodetector corresponding to the optical ring resonator filter 417(1) to 417(N). In some embodiments, the photodetector is integrated within the optical ring resonator filter 413(1) to 413(N). Additional description of photodetector integration within an optical ring resonator is provided in U.S. patent application Ser. No. 15/687,413, which is incorporated in its entirety herein by reference for all purposes. In some embodiments, the photodetector is configured and connected to operate as a sensor for wavelength lock within the optical ring resonator filter 413(1) to 413(N). In some embodiments, the optical demultiplexer 119 includes heaters 415(1) to 415(N) respectively embedded within the at least one ring resonator 417(1) to 417(N). The heaters 415(1) to 415(N) are electrically controllable to enable control of respective resonant wavelength of the at least one ring resonator 417(1) to 417(N). In some embodiments, the optical demultiplexer 119 includes embedded digital control loops 419(1) to 419(N) respectively connected to the heaters 415(1) to 415(N). A given embedded digital control loop 419(1) to 419(N) is configured to sense an amount of light that is absorbed within a given ring resonator 417(1) to 417(N). In this manner, the embedded digital control loops 419(1) to 419(N) are electrically connected to the photodetectors that are integrated within the optical ring resonator filters 413(1) to 413(N), respectively, in order to sense the amount of light that is absorbed within the ring resonators 417(1) to 417(N).

In some embodiments, the optical multiplexer 121 includes N optical waveguides 125(1) to 125(N) respectively optically coupled to the N server uplink optical ports S1u to SNu. The optical multiplexer 121 includes N polarization control devices 503(1) to 503(N) optically coupled to the N optical waveguides 125(1) to 125(N). Each of the N polarization control devices 503(1) to 503(N) is configured to split light received through the N optical waveguides 125(1) to 125(N) from the corresponding N server uplink optical ports S1u to SNu into a first polarization of light and a second polarization of light. In some embodiments, each of the N polarization control devices 503(1) to 503(N) includes a polarization splitting optical grating. In some embodiments, each of the N polarization control devices 503(1) to 503(N) includes a polarization independent optical coupler having an optical output coupled to an optical input of a polarization splitter-rotator. In some embodiments, each of the N polarization control devices 503(1) to 503(N) includes a thermally controlled Mach-Zehnder interferometer configured to combine the first polarization of light and the second polarization of light onto a single optical waveguide. The optical multiplexer 121 includes a tunable optical ring resonator filterbank 511 that includes N optical ring resonator filters 513(1) to 513(N). Each of the N optical ring resonator filters 513(1) to 513(N) includes at least one ring resonator 517(1) to 517(N) configured to drop one or more wavelengths of the N uplink data communication optical signals to a photodetector corresponding to the optical ring resonator filter 513(1) to 513(N). In some embodiments, the photodetector is integrated within the optical ring resonator filter 513(1) to 513(N). In some embodiments, the photodetector is configured and connected to operate as a sensor for wavelength lock within the optical ring resonator filter 513(1) to 513(N).

In some embodiments, the optical multiplexer 121 includes heaters 515(1) to 515(N) respectively embedded within the at least one ring resonator 517(1) to 517(N). The heaters 515(1) to 515(N) are electrically controllable to enable control of respective resonant wavelength of the at least one ring resonator 517(1) to 517(N). Embedded digital control loops 519(1) to 519(N) are respectively connected to the heaters 515(1) to 515(N). A given embedded digital control loop 519(1) to 519(N) is configured to sense an amount of light that is absorbed within a given ring resonator 517(1) to 517(N). In this manner, the embedded digital control loops 519(1) to 519(N) are electrically connected to the photodetectors that are integrated within the optical ring resonator filters 513(1) to 513(N), respectively, in order to sense the amount of light that is absorbed within the ring resonators 517(1) to 517(N). The tunable optical ring resonator filterbank 511 is configured to aggregate selected ones of the N uplink data communication optical signals onto the output optical waveguide 512. The output optical waveguide 521 is optically coupled to the uplink optical port (half of 113) by way of the uplink optical waveguide 117.

In some embodiments, an electro-optical interface module 601 is disclosed. The electro-optical interface module 601 is also referred to herein as the Reverb module 601. The electro-optical interface module 601 includes an optical fiber interface configured to optically couple to the first optical fiber 607A and the second optical fiber 607B. The electro-optical interface module 601 includes the Reverb chip 603 (electronic-photonic chip) that includes a first optical coupler and a second optical coupler. The first optical coupler is configured and connected to receive light transmitted through the optical fiber interface from the first optical fiber 607A. The second optical coupler is configured and connected to direct light through the optical fiber interface to the second optical fiber 607B. In some embodiments, the Reverb chip 603 includes the downlink polarization control device 703 configured to split light received through the first optical coupler by way of the optical fiber 607A into a first polarization of light and a second polarization of light. The Reverb chip 603 also includes the downlink data receiver device 709 configured and connected to receive light from the downlink polarization control device 703. The downlink data receiver device 709 is configured and connected to filter downlink modulated light from the light received from the downlink polarization control device 703, and convert the downlink modulated light into a downlink electrical data signal. The downlink data receiver device 709 is configured and connected to direct unmodulated continuous wave light received from the downlink polarization control device 703 to an optical output of the downlink data receiver device 709. In some embodiments, the downlink polarization control device 703 includes a polarization splitting optical grating. In some embodiments, the downlink polarization control device 703 includes a polarization independent optical coupler having an optical output coupled to an optical input of a polarization splitter-rotator. In some embodiments, the downlink polarization control device 703 includes a thermally controlled Mach-Zehnder interferometer configured to combine the first polarization of light and the second polarization of light onto a single optical waveguide.

The Reverb chip 603 also includes the uplink data modulator device 711 configured and connected to receive the unmodulated continuous wave light from the optical output of the downlink polarization control device 709 by way of optical waveguide 705. The uplink data modulator device 711 is configured and connected to imprint an uplink electrical data signal on the unmodulated continuous wave light to generate uplink modulated light. The uplink data modulator device 711 is configured and connected to direct the uplink modulated light to the second optical coupler of the Reverb chip 603.

The Reverb chip 603 also includes the electrical input/output block 713 configured and connected to receive the downlink electrical data signal from the downlink data receiver device 709, and direct the downlink electrical data signal to circuitry external to the Reverb chip 603. The electrical input/output block 713 is configured and connected to receive the uplink electrical data signal from circuitry external to the Reverb chip 603 and direct the uplink electrical data signal to the uplink data modulator device 711.

In some embodiments, the electronic components and photonic components of the Reverb chip 603 are integrated monolithically on a same die formed in a CMOS fabrication process. In some embodiments, the Reverb chip 603 includes electronic circuitry for controlling a polarization and a resonant wavelength of photonic components within the Reverb chip 603. In some embodiments, the Reverb chip 603 includes non-retimed electronic circuitry including optical receivers and optical modulator drivers. In some embodiments, the Reverb chip 603 includes retimed electronic circuitry including a serializer circuit, a deserializer circuit, a clock generator, a phase-lock loop, and a clock-data-recovery loop.

In some embodiments, the downlink data receiver device 709 includes one or more resonant ring filters configured to drop one or more wavelengths of downlink modulated light to one or more photodetectors respectively corresponding to the one or more resonant ring filters. In some embodiments, the one or more photodetectors are respectively integrated in the one or more resonant ring filters. In some embodiments, the downlink data receiver device 709 includes one or more heaters respectively embedded within the one or more resonant ring filters, where the one or more heaters are electrically controllable to enable control of respective resonant wavelengths of the one or more resonant ring filters. In some embodiments, one or more embedded digital control loops are respectively connected to the one or more heaters, where a given embedded digital control loop is configured to sense an amount of light that is absorbed within a given resonant ring filter corresponding to a given heater connected to the given embedded digital control loop. In some embodiments, the one or more embedded digital control loops are implemented within the Reverb chip 603. In some embodiments, the one or more embedded digital control loops are implemented within a CMOS chip different from the Reverb chip 603.

In some embodiments, the uplink data modulator device 711 includes one or more resonant ring modulators respectively tuned to one or more wavelengths of the unmodulated continuous wave light received from the optical output of the downlink polarization control device 703. In some embodiments, the uplink data receiver device 711 includes one or more heaters respectively embedded within the one or more resonant ring modulators, where the one or more heaters are electrically controllable to enable control of respective resonant wavelengths of the one or more resonant ring modulators. In some embodiments, the one or more embedded digital control loops are respectively connected to the one or more heaters, where a given embedded digital control loop is configured to sense an amount of light that is absorbed within a given resonant ring modulator corresponding to a given heater connected to the given embedded digital control loop. In some embodiments, the one or more embedded digital control loops are implemented within the Reverb chip 603. In some embodiments, the one or more embedded digital control loops are implemented within a CMOS chip different from the Reverb chip 603.

Figure 10:
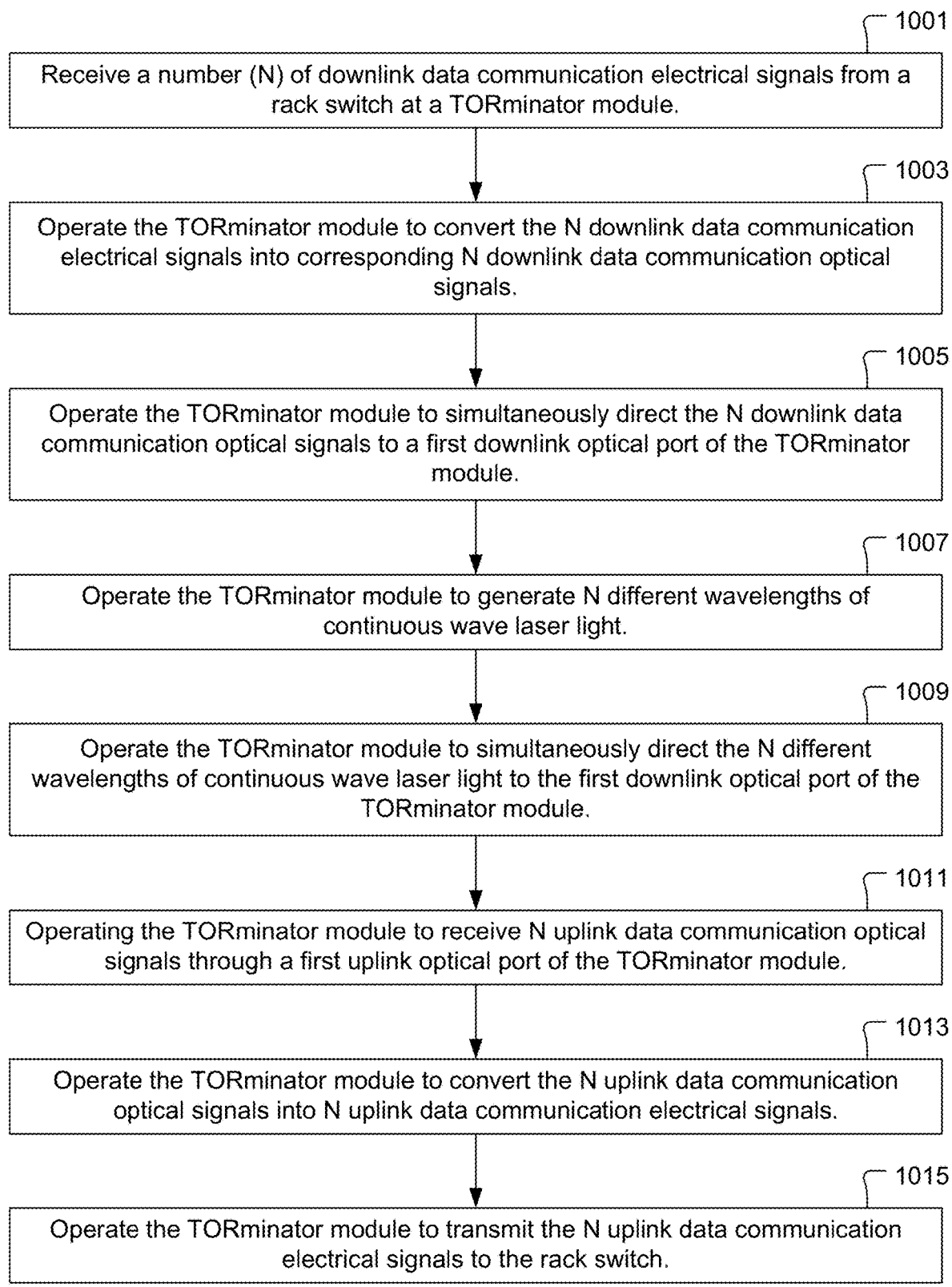
FIG. 10 shows a flowchart of a method for controlling data communication, in accordance with some embodiments.

FIG. 10 shows a flowchart of a method for controlling data communication, in accordance with some embodiments. The method includes an operation 1001 for receiving a number (N) of downlink data communication electrical signals from a rack switch (103) at a TORminator module (107). The value of N is greater than one. The method also includes an operation 1003 for operating the TORminator module (107) to convert the N downlink data communication electrical signals into corresponding N downlink data communication optical signals. Each of the N downlink data communication optical signals has a different optical wavelength. The method also includes an operation 1005 for operating the TORminator module (107) to simultaneously direct the N downlink data communication optical signals to a first downlink optical port (half of each of 109-1 to 109-K) of the TORminator module (107). The method also includes an operation 1007 for operating the TORminator module (107) to generate N different wavelengths of continuous wave laser light. In some embodiments, the method includes operating a laser chip (205) within the TORminator module (107) to generate the N different wavelengths of continuous wave laser light. In some embodiments, the value of N is 8. In some embodiments, the value of N is either greater than or less than 8. The method also includes an operation 1009 for operating the TORminator module to simultaneously direct the N different wavelengths of continuous wave laser light to the first downlink optical port (half of each of 109-1 to 109-K) of the TORminator module (107). The method also includes an operation 1011 for operating the TORminator module (107) to receive N uplink data communication optical signals through a first uplink optical port (half of each of 109-1 to 109-K) of the TORminator module (107). The method also includes an operation 1013 for operating the TORminator module (107) to convert the N uplink data communication optical signals into N uplink data communication electrical signals. The method also includes an operation 1015 for operating the TORminator module (107) to transmit the N uplink data communication electrical signals to the rack switch (103).

In some embodiments, the method of FIG. 10 also includes operating a SmartDistribuTOR module (111-*x*) to simultaneously receive the N downlink data communication optical signals and the N different wavelengths of continuous wave laser light from the first downlink optical port of the TORminator module (107) through a single optical waveguide (115). The method also includes operating the SmartDistribuTOR module (111-*x*) to respectively direct the N downlink data communication optical signals and the N different wavelengths of continuous wave laser light to N servers, such that each of the N servers receives a different one of the N downlink data communication optical signals and a different one the N different wavelengths of continuous wave laser light. The method also includes operating the SmartDistribuTOR module (111-*x*) to receive N uplink data communication optical signals from the N servers. The method also includes operating the SmartDistribuTOR module (111-*x*) to simultaneously direct the N uplink data communication optical signals through a single optical waveguide to the TORminator module (107).

In some embodiments, the method of FIG. 10 also includes operating N reverb modules (601) respectively disposed within the N servers to respectively receive the N downlink data communication optical signals and the N different wavelengths of continuous wave laser light from the SmartDistribuTOR module (111-*x*). The method also includes operating each of the N reverb modules (601) to convert the downlink data communication optical signal received from the SmartDistribuTOR module (111-*x*) into a corresponding data communication electrical signal for processing by the server in which the reverb module (601) is disposed. The method also includes operating each of the N reverb modules (601) to convert a data communication electrical signal provided by the server in which the reverb module (601) is disposed into an uplink data communication optical signal. The method also includes operating each of the N reverb modules (601) to transmit the uplink data communication optical signal to the SmartDistribuTOR module (111-*x*). Each of the N reverb modules (601) modulates a respective one of the N different wavelengths of continuous wave laser light to convert the data communication electrical signal provided by the server in which the reverb module (601) is disposed into the uplink data communication optical signal.

In some embodiments, the method of FIG. 10 includes operating the TORminator module (107) to receive a number (M) of downlink data communication electrical signals from the rack switch (103), wherein M is an integer (K) multiple of N, i.e., M=(K)(N), and where the previously mentioned N downlink data communication electrical signals are included in the M downlink data communication electrical signals. In some embodiments, K is 16, N is 8, and M is 128. However, in other embodiments, K is greater or less than 16, and/or N is greater or less than 8, and M equals N multiplied by K. The method also includes operating the TORminator module (107) to convert the M downlink data communication electrical signals into corresponding M downlink data communication optical signals. The method also includes operating the TORminator module (107) to distribute the M downlink data communication optical signals into K sets of N downlink data communication optical signals per set. Each of the N downlink data communication optical signals in a given one of the K sets has a different optical wavelength. The method also includes operating the TORminator module (107) to simultaneously direct the N downlink data communication optical signals in a given one of the K sets to a respective one of K downlink optical ports of the TORminator module (107). The previously mentioned first downlink optical port of the TORminator module (107) is a first of the K downlink optical ports of the TORminator module (107). The method also includes operating the TORminator module (107) to simultaneously direct the N different wavelengths of continuous wave laser light to each of the K downlink optical ports of the TORminator module (107). The method also includes operating the TORminator module (107) to receive N uplink data communication optical signals through each of K uplink optical ports. The previously mentioned first uplink optical port of the TORminator module (107) is a first of the K uplink optical ports of the TORminator module (107). The method also includes operating the TORminator module (107) to convert the N uplink data communication optical signals received through each of the K uplink optical ports into N uplink data communication electrical signals to constitute M uplink data communication electrical signals. The method also includes operating the TORminator module (107) to transmit the M uplink data communication electrical signals to the rack switch (103).

In some embodiments, the method also includes operating each of K SmartDistribuTOR modules (111-1 to 111-K) to receive the N downlink data communication optical signals in a corresponding one of the K sets from the TORminator module (107). The method also includes operating each of the K SmartDistribuTOR modules (111-1 to 111-K) to receive the N different wavelengths of continuous wave laser light from the TORminator module (107). The method also includes operating each of the K SmartDistribuTOR modules (111-1 to 111-K) to separate the N downlink data communication optical signals and respectively transmit the N downlink data communication optical signals to N servers. The method also includes operating each of the K SmartDistribuTOR modules (111-1 to 111-K) to respectively transmit the N different wavelengths of continuous wave laser light to the N servers.

The method also includes operating each of the K SmartDistribuTOR modules (111-1 to 111-K) to receive N uplink data communication optical signals from the N servers. The method also includes operating each of the K SmartDistribuTOR modules (111-1 to 111-K) to aggregate the N uplink data communication optical signals onto a single optical waveguide and transmit the N uplink data communication optical signals through the single optical waveguide to the TORminator module (107), such that the TORminator module (107) collectively receives M uplink data communication optical signals from the K SmartDistribuTOR modules (111-1 to 111-K). The method also includes operating the TORminator module (107) to convert the M uplink data communication optical signals into M uplink data communication electrical signals. The method also includes operating the TORminator module (107) to transmit the M uplink data communication electrical signals to the rack switch (103).

Figure 11:
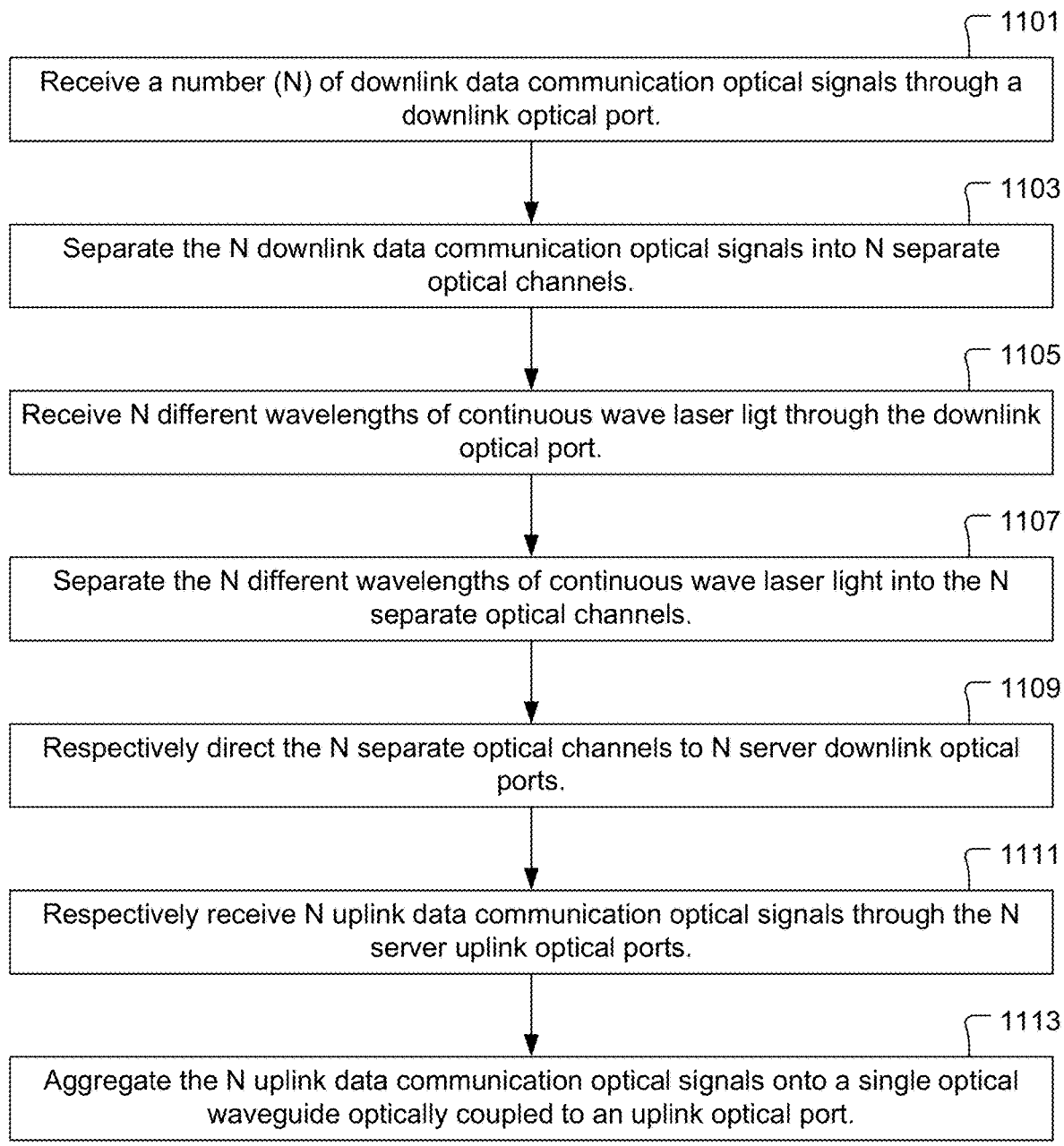
FIG. 11 shows a flowchart of a method for operating an optical multiplexer/demultiplexer module, in accordance with some embodiments.

FIG. 11 shows a flowchart of a method for operating an optical multiplexer/demultiplexer module, in accordance with some embodiments. The optical multiplexer/demultiplexer module of the method of FIG. 11 is the SmartDistribuTOR module (111-x) disclosed herein. The method includes an operation 1101 for receiving a number (N) of downlink data communication optical signals through a downlink optical port (half of 113). The method also includes an operation 1103 for separating the N downlink data communication optical signals into N separate optical channels. The method also includes an operation 1105 for receiving N different wavelengths of continuous wave laser light through the downlink optical port (half of 113). The method also includes an operation 1107 for separating the N different wavelengths of continuous wave laser light into the N separate optical channels. The method also includes an operation 1109 for respectively directing the N separate optical channels to N server downlink optical ports (S1d to SNd). The method also includes an operation 1111 for respectively receiving N uplink data communication optical signals through the N server uplink optical ports (S1u to SNu). The method also includes an operation 1113 for aggregating the N uplink data communication optical signals onto a single optical waveguide (117) optically coupled to an uplink optical port (half of 113).

In some embodiments, the method includes transmitting the N downlink data communication optical signals through a downlink polarization control device (403) to split each of the N downlink data communication optical signals into a first polarization of light and a second polarization of light. In some embodiments, the operation 1103 for separating the N downlink data communication optical signals into N separate optical channels is performed by operating a tunable optical ring resonator filterbank (407) that includes N optical ring resonator filters (413(1)-413(N)). Each of the N optical ring resonator filters (413(1)-413(N)) includes at least one ring resonator (417(1)-417(N)) operating to drop one or more wavelengths of the N downlink data communication optical signals to a photodetector corresponding to the optical ring resonator filter (413(1)-413(N)).

In some embodiments, operating the tunable optical ring resonator filterbank (407) includes operating heaters (415(1)-415(N)) respectively embedded within the at least one ring resonator (417(1)-417(N)) to control a respective resonant wavelength of the at least one ring resonator (417(1)-417(N)). In some embodiments, the method includes respectively transmitting the N uplink data communication optical signals through N uplink polarization control devices (503(1)-503(N)) to split each of the N uplink data communication optical signals into a first polarization of light and a second polarization of light. The method also includes aggregating the N uplink data communication optical signals onto the single optical waveguide (117) includes operating a tunable optical ring resonator filterbank (511) that includes N optical ring resonator filters (513(1)-513(N)). Each of the N optical ring resonator filters (513(1)-513(N)) includes at least one ring resonator (517(1)-517(N)) operating to drop one or more wavelengths of the N uplink data communication optical signals to a photodetector corresponding to the optical ring resonator filter (513(1)-513(N)). In some embodiments, operating the tunable optical ring resonator filterbank (511) includes operating heaters (515(1)-515(N)) respectively embedded within the at least one ring resonator (517(1)-517(N)) to control a respective resonant wavelength of the at least one ring resonator (517(1)-517(N)).

Figure 12:
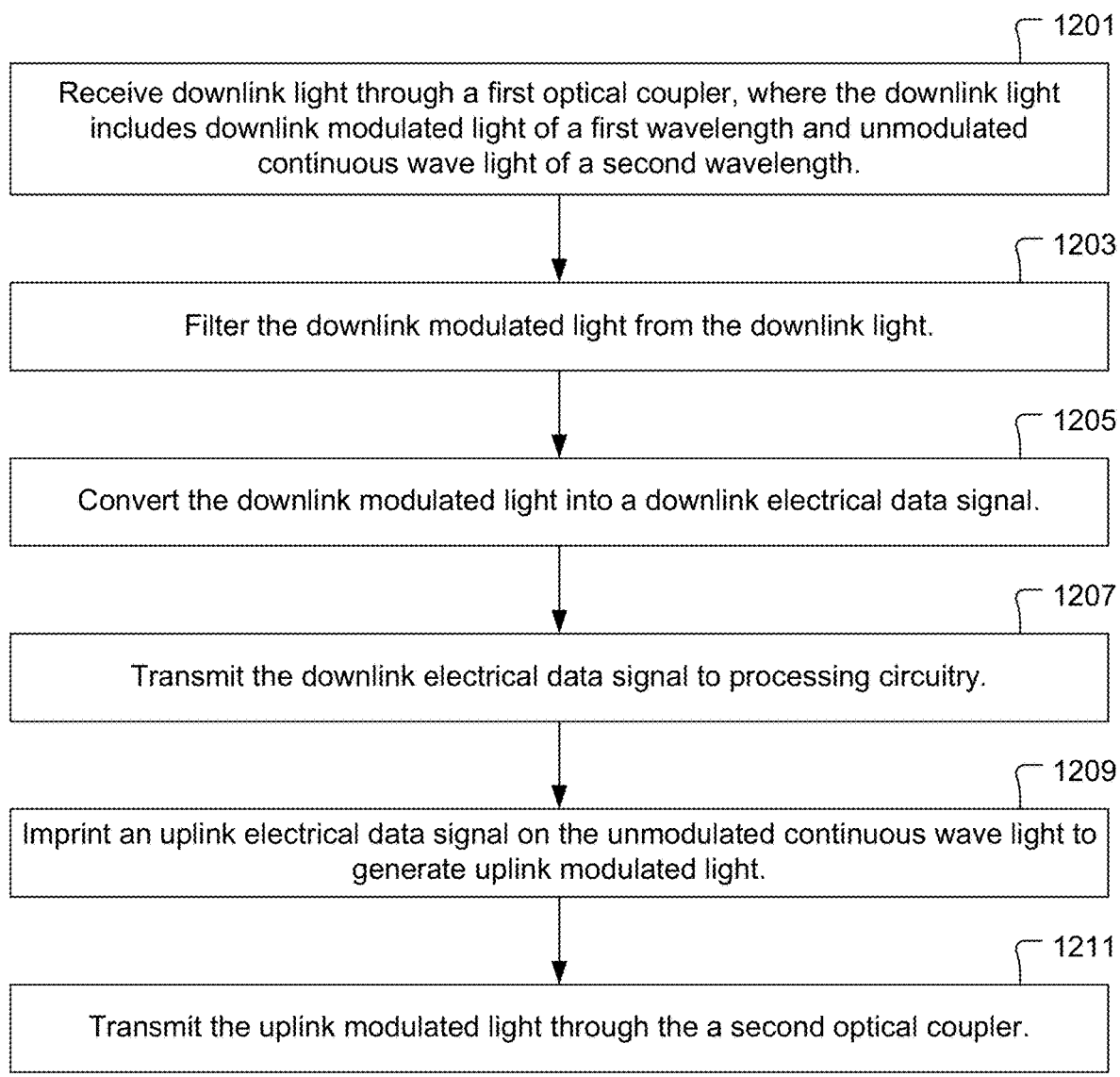
FIG. 12 shows a flowchart of a method for operating an electro-optical interface of a server, in accordance with some embodiments.

FIG. 12 shows a flowchart of a method for operating an electro-optical interface of a server, in accordance with some embodiments. The electro-optical interface of the server is the Reverb module 601 disclosed herein. The method includes an operation 1201 for receiving downlink light through a first optical coupler, where the downlink light includes downlink modulated light of a first wavelength and unmodulated continuous wave light of a second wavelength. The method also includes an operation 1203 for filtering the downlink modulated light from the downlink light. In some embodiments, the method also includes splitting the downlink light into a first polarization of light and a second polarization of light prior to filtering the downlink modulated light from the downlink light in operation 1203. The method also includes an operation 1205 for converting the downlink modulated light into a downlink electrical data signal. The method also includes an operation 1207 for transmitting the downlink electrical data signal to processing circuitry. The method also includes an operation 1209 for imprinting an uplink electrical data signal on the unmodulated continuous wave light to generate uplink modulated light. The method also includes an operation 1211 for transmitting the uplink modulated light through the a second optical coupler.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the present embodiments are to be considered as illustrative and not restrictive, and the invention is not to be limited to the details given herein, but may be modified within the scope and equivalents of the described embodiments.

What is claimed is:

1. An optical multiplexer/demultiplexer module, comprising:
   a downlink optical port;
   an uplink optical port;
   a number (N) of server downlink optical ports;
   N server uplink optical ports;
   an optical demultiplexer configured to separate N downlink data communication optical signals received through the downlink optical port based on optical wavelength, the optical demultiplexer configured to respectively direct the N downlink data communication optical signals to the N server downlink optical ports, the optical demultiplexer configured to separate N different wavelengths of continuous wave laser light received through the downlink optical port based on optical wavelength, the optical demultiplexer configured to respectively direct the N different wavelengths of continuous wave laser light to the N server downlink optical ports;
   an optical multiplexer configured to aggregate N uplink data communication optical signals received through the N server uplink optical ports onto a single optical waveguide optically coupled to the uplink optical port; and
   a downlink polarization control device configured to split light received through downlink optical port into a first polarization of light and a second polarization of light, wherein the downlink polarization control device includes a polarization independent optical coupler having an optical output coupled to an optical input of a polarization splitter-rotator.

2. The optical multiplexer/demultiplexer module as recited in claim 1, wherein the optical demultiplexer includes a tunable optical ring resonator filterbank that includes N optical ring resonator filters, wherein each of the N optical ring resonator filters includes at least one ring resonator configured to drop one or more wavelengths of the N downlink data communication optical signals to a photodetector corresponding to the optical ring resonator filter.

3. The optical multiplexer/demultiplexer module as recited in claim 2, wherein the optical demultiplexer includes heaters respectively thermally associated with the at least one ring resonator, wherein heaters are electrically controllable to enable control of respective resonant wavelength of the at least one ring resonator.

4. The optical multiplexer/demultiplexer module as recited in claim 3, wherein embedded digital control loops are respectively connected to the heaters, wherein a given embedded digital control loop is configured to sense an amount of light that is absorbed within a given ring resonator.

5. The optical multiplexer/demultiplexer module as recited in claim 4, wherein embedded digital control loops and the N optical ring resonator filters are integrated together on a same die.

6. The optical multiplexer/demultiplexer module as recited in claim 3, wherein each of the heaters is disposed within a region circumscribed by a corresponding ring resonator of the at least one ring resonator.

7. The optical multiplexer/demultiplexer module as recited in claim 2, wherein each ring resonator of the N optical ring resonator filters has an outer diameter of less than 50 micrometers.

8. The optical multiplexer/demultiplexer module as recited in claim 2, wherein the photodetector corresponding to the optical ring resonator filter is integrated within the optical ring resonator filter.

9. The optical multiplexer/demultiplexer module as recited in claim 2, wherein the photodetector corresponding to the optical ring resonator filter is configured and connected to operate as a sensor for wavelength lock of the optical ring resonator filter.

10. The optical multiplexer/demultiplexer module as recited in claim 1, wherein each of the N server downlink optical ports is optically coupled to a respective one of N servers, and wherein each of the N server uplink optical ports is optically coupled to a respective one of the N servers.

11. The optical multiplexer/demultiplexer module as recited in claim 1, wherein the downlink polarization control device includes a polarization splitting optical grating.

12. An optical multiplexer/demultiplexer module, comprising:
a downlink optical port;
an uplink optical port;
a number (N) of server downlink optical ports;
N server uplink optical ports;
an optical demultiplexer configured to separate N downlink data communication optical signals received through the downlink optical port based on optical wavelength, the optical demultiplexer configured to respectively direct the N downlink data communication optical signals to the N server downlink optical ports, the optical demultiplexer configured to separate N different wavelengths of continuous wave laser light received through the downlink optical port based on optical wavelength, the optical demultiplexer configured to respectively direct the N different wavelengths of continuous wave laser light to the N server downlink optical ports;
an optical multiplexer configured to aggregate N uplink data communication optical signals received through the N server uplink optical ports onto a single optical waveguide optically coupled to the uplink optical port; and
a downlink polarization control device configured to split light received through downlink optical port into a first polarization of light and a second polarization of light, wherein the downlink polarization control device includes a thermally controlled Mach-Zehnder interferometer configured to combine the first polarization of light and the second polarization of light onto a single optical waveguide.

13. The optical multiplexer/demultiplexer module as recited in claim 12, wherein the optical demultiplexer includes a tunable optical ring resonator filterbank that includes N optical ring resonator filters, wherein each of the N optical ring resonator filters includes at least one ring resonator configured to drop one or more wavelengths of the N downlink data communication optical signals to a photodetector corresponding to the optical ring resonator filter.

14. The optical multiplexer/demultiplexer module as recited in claim 13, wherein the optical demultiplexer includes heaters respectively thermally associated with the at least one ring resonator, wherein heaters are electrically controllable to enable control of respective resonant wavelength of the at least one ring resonator.

15. The optical multiplexer/demultiplexer module as recited in claim 14, wherein embedded digital control loops are respectively connected to the heaters, wherein a given embedded digital control loop is configured to sense an amount of light that is absorbed within a given ring resonator.

16. The optical multiplexer/demultiplexer module as recited in claim 15, wherein embedded digital control loops and the N optical ring resonator filters are integrated together on a same die.

17. The optical multiplexer/demultiplexer module as recited in claim 14, wherein each of the heaters is disposed within a region circumscribed by a corresponding ring resonator of the at least one ring resonator.

18. The optical multiplexer/demultiplexer module as recited in claim 13, wherein each ring resonator of the N optical ring resonator filters has an outer diameter of less than 50 micrometers.

19. The optical multiplexer/demultiplexer module as recited in claim 13, wherein the photodetector corresponding to the optical ring resonator filter is integrated within the optical ring resonator filter.

20. The optical multiplexer/demultiplexer module as recited in claim 13, wherein the photodetector corresponding to the optical ring resonator filter is configured and connected to operate as a sensor for wavelength lock of the optical ring resonator filter.

21. The optical multiplexer/demultiplexer module as recited in claim 12, wherein each of the N server downlink optical ports is optically coupled to a respective one of N servers, and wherein each of the N server uplink optical ports is optically coupled to a respective one of the N servers.

22. The optical multiplexer/demultiplexer module as recited in claim 12, wherein the downlink polarization control device includes a polarization splitting optical grating.

23. An optical multiplexer/demultiplexer module, comprising:
a downlink optical port;
an uplink optical port;
a number (N) of server downlink optical ports;
N server uplink optical ports;
an optical demultiplexer configured to separate N downlink data communication optical signals received through the downlink optical port based on optical wavelength, the optical demultiplexer configured to respectively direct the N downlink data communication optical signals to the N server downlink optical ports, the optical demultiplexer configured to separate N different wavelengths of continuous wave laser light received through the downlink optical port based on optical wavelength, the optical demultiplexer configured to respectively direct the N different wavelengths of continuous wave laser light to the N server downlink optical ports; and
an optical multiplexer configured to aggregate N uplink data communication optical signals received through the N server uplink optical ports onto a single optical waveguide optically coupled to the uplink optical port, wherein the optical multiplexer includes N optical waveguides respectively optically coupled to the N server uplink optical ports, wherein the optical multiplexer includes N polarization control devices optically coupled to the N optical waveguides, wherein each of the N polarization control devices is configured to split light received through the N optical waveguides from the corresponding N server uplink optical ports into a first polarization of light and a second polarization of light, wherein each of the N polarization control devices includes a polarization independent optical coupler having an optical output coupled to an optical input of a polarization splitter-rotator.

24. The optical multiplexer/demultiplexer module as recited in claim 23, wherein the optical multiplexer includes a tunable optical ring resonator filterbank that includes N optical ring resonator filters, wherein each of the N optical ring resonator filters includes at least one ring resonator configured to drop one or more wavelengths of the N uplink data communication optical signals to a photodetector corresponding to the optical ring resonator filter.

25. The optical multiplexer/demultiplexer module as recited in claim 24, wherein the optical multiplexer includes heaters respectively thermally associated with the at least one ring resonator, wherein the heaters are electrically controllable to enable control of respective resonant wavelength of the at least one ring resonator.

26. The optical multiplexer/demultiplexer module as recited in claim 25, wherein embedded digital control loops are respectively connected to the heaters, wherein a given embedded digital control loop is configured to sense an amount of light that is absorbed within a given ring resonator.

27. The optical multiplexer/demultiplexer module as recited in claim 26, wherein embedded digital control loops and the N optical ring resonator filters are integrated together on a same die.

28. The optical multiplexer/demultiplexer module as recited in claim 25, wherein each of the heaters is disposed within a region circumscribed by a corresponding ring resonator of the at least one ring resonator.

29. The optical multiplexer/demultiplexer module as recited in claim 24, wherein each ring resonator of the N optical ring resonator filters has an outer diameter of less than 50 micrometers.

30. The optical multiplexer/demultiplexer module as recited in claim 24, wherein the photodetector corresponding to the optical ring resonator filter is integrated within the optical ring resonator filter.

31. The optical multiplexer/demultiplexer module as recited in claim 24, wherein the photodetector corresponding to the optical ring resonator filter is configured and connected to operate as a sensor for wavelength lock of the optical ring resonator filter.

32. The optical multiplexer/demultiplexer module as recited in claim 23, wherein each of the N server downlink optical ports is optically coupled to a respective one of N servers, and wherein each of the N server uplink optical ports is optically coupled to a respective one of the N servers.

33. The optical multiplexer/demultiplexer module as recited in claim 23, wherein each of the N polarization control devices includes a polarization splitting optical grating.

34. An optical multiplexer/demultiplexer module, comprising:
a downlink optical port;
an uplink optical port;
a number (N) of server downlink optical ports;
N server uplink optical ports;
an optical demultiplexer configured to separate N downlink data communication optical signals received through the downlink optical port based on optical wavelength, the optical demultiplexer configured to respectively direct the N downlink data communication optical signals to the N server downlink optical ports, the optical demultiplexer configured to separate N different wavelengths of continuous wave laser light received through the downlink optical port based on optical wavelength, the optical demultiplexer configured to respectively direct the N different wavelengths of continuous wave laser light to the N server downlink optical ports; and
an optical multiplexer configured to aggregate N uplink data communication optical signals received through the N server uplink optical ports onto a single optical waveguide optically coupled to the uplink optical port, wherein the optical multiplexer includes N optical waveguides respectively optically coupled to the N server uplink optical ports, wherein the optical multiplexer includes N polarization control devices optically coupled to the N optical waveguides, wherein each of the N polarization control devices is configured to split light received through the N optical waveguides from the corresponding N server uplink optical ports into a first polarization of light and a second polarization of light, wherein each of the N polarization control devices includes a thermally controlled Mach-Zehnder interferometer configured to combine the first polarization of light and the second polarization of light onto a single optical waveguide.

35. The optical multiplexer/demultiplexer module as recited in claim 34, wherein the optical multiplexer includes a tunable optical ring resonator filterbank that includes N optical ring resonator filters, wherein each of the N optical ring resonator filters includes at least one ring resonator configured to drop one or more wavelengths of the N uplink data communication optical signals to a photodetector corresponding to the optical ring resonator filter.

36. The optical multiplexer/demultiplexer module as recited in claim 35, wherein the optical multiplexer includes heaters respectively thermally associated with the at least one ring resonator, wherein the heaters are electrically controllable to enable control of respective resonant wavelength of the at least one ring resonator.

37. The optical multiplexer/demultiplexer module as recited in claim 36, wherein embedded digital control loops are respectively connected to the heaters, wherein a given embedded digital control loop is configured to sense an amount of light that is absorbed within a given ring resonator.

38. The optical multiplexer/demultiplexer module as recited in claim 37, wherein embedded digital control loops and the N optical ring resonator filters are integrated together on a same die.

39. The optical multiplexer/demultiplexer module as recited in claim 36, wherein each of the heaters is disposed within a region circumscribed by a corresponding ring resonator of the at least one ring resonator.

40. The optical multiplexer/demultiplexer module as recited in claim 35, wherein each ring resonator of the N optical ring resonator filters has an outer diameter of less than 50 micrometers.

41. The optical multiplexer/demultiplexer module as recited in claim 35, wherein the photodetector corresponding to the optical ring resonator filter is integrated within the optical ring resonator filter.

42. The optical multiplexer/demultiplexer module as recited in claim 35, wherein the photodetector corresponding to the optical ring resonator filter is configured and connected to operate as a sensor for wavelength lock of the optical ring resonator filter.

43. The optical multiplexer/demultiplexer module as recited in claim 34, wherein each of the N server downlink optical ports is optically coupled to a respective one of N servers, and wherein each of the N server uplink optical ports is optically coupled to a respective one of the N servers.

44. The optical multiplexer/demultiplexer module as recited in claim 34, wherein each of the N polarization control devices includes a polarization splitting optical grating.

* * * * *